United States Patent
Jung et al.

(10) Patent No.: US 11,516,323 B2
(45) Date of Patent: Nov. 29, 2022

(54) ELECTRONIC DEVICE INCLUDING SUPPLEMENTARY STRUCTURE

(71) Applicant: Samsung Electronics Co., Ltd., Gyeonggi-do (KR)

(72) Inventors: Minsu Jung, Gyeonggi-do (KR); Changyong Seo, Gyeonggi-do (KR); Yongseok Lee, Gyeonggi-do (KR); Jongchul Choi, Gyeonggi-do (KR)

(73) Assignee: Samsung Electronics CO., LTD., Suwon-si (KR)

( * ) Notice: Subject to any disclaimer, the term of this patent is extended or adjusted under 35 U.S.C. 154(b) by 116 days.

(21) Appl. No.: 17/114,903

(22) Filed: Dec. 8, 2020

(65) Prior Publication Data

US 2021/0211530 A1 Jul. 8, 2021

(30) Foreign Application Priority Data

Jan. 2, 2020 (KR) .................. 10-2020-0000425

(51) Int. Cl.
*H04M 1/02* (2006.01)
(52) U.S. Cl.
CPC ....... *H04M 1/0216* (2013.01); *H04M 1/0268* (2013.01)
(58) Field of Classification Search
CPC ............ H04M 1/0216; H04M 1/0268; H04M 1/0266; G06F 1/1652; G06F 1/1681; H05K 5/0226; H05K 5/0086; H05K 5/0217; G09F 9/301
See application file for complete search history.

(56) References Cited

U.S. PATENT DOCUMENTS

| | | |
|---|---|---|
| 6,628,974 B1 | 9/2003 | Lim |
| 8,676,269 B2 | 3/2014 | Song et al. |
| 9,535,452 B2 | 1/2017 | Ahn |
| 9,703,327 B2 | 7/2017 | Sprenger et al. |

(Continued)

FOREIGN PATENT DOCUMENTS

| | | |
|---|---|---|
| CN | 207399685 U | 5/2018 |
| CN | 207399686 U | 5/2018 |

(Continued)

OTHER PUBLICATIONS

European Search Report dated Jan. 7, 2022.

(Continued)

*Primary Examiner* — Lester G Kincaid
*Assistant Examiner* — Maryam Soltanzadeh
(74) *Attorney, Agent, or Firm* — Cha & Reiter, LLC

(57) ABSTRACT

An electronic device includes: a first housing and second housing connected via a hinge, all of which are overlaid by a flexible display; a hinge housing in which the hinge is seated, and a supplementary structure coupled to an edge of the hinge housing to hide at least part of a peripheral edge of the flexible display, wherein the supplementary structure includes a fixing bracket coupled to the hinge housing, a first wing part coupled to the fixing bracket and disposed between the first member and the first housing, a second wing part coupled to the fixing bracket and disposed between the second member and the second housing, and a coupling part coupling the first wing part and the second wing part to the fixing bracket.

20 Claims, 17 Drawing Sheets

(56) References Cited

U.S. PATENT DOCUMENTS

| | | |
|---|---|---|
| 9,760,126 B2 | 9/2017 | Shin et al. |
| 9,786,207 B2 | 10/2017 | Kim et al. |
| 9,992,888 B2 | 6/2018 | Moon et al. |
| 10,032,391 B2 | 7/2018 | Kim et al. |
| 10,306,783 B2 | 5/2019 | Seo et al. |
| 10,310,551 B2 | 6/2019 | Bae et al. |
| 10,365,691 B2 | 7/2019 | Bae et al. |
| 10,433,438 B2 | 10/2019 | Moon et al. |
| 10,435,932 B2 | 10/2019 | Sprenger et al. |
| 10,474,196 B2 | 11/2019 | Yeh |
| 10,503,211 B2 | 12/2019 | Yee et al. |
| 10,845,850 B1 * | 11/2020 | Kang .................. H04M 1/022 |
| 10,863,641 B2 | 12/2020 | Jeon et al. |
| 10,945,346 B2 | 3/2021 | Moon et al. |
| 11,019,742 B2 | 5/2021 | Hsu et al. |
| 11,224,137 B2 * | 1/2022 | Hsu ........................ E05D 3/18 |
| 11,266,033 B2 | 3/2022 | Moon et al. |
| 2006/0288535 A1 | 12/2006 | Lu et al. |
| 2010/0197356 A1 | 8/2010 | Song et al. |
| 2012/0236484 A1 | 9/2012 | Miyake |
| 2016/0070306 A1 | 3/2016 | Shin et al. |
| 2016/0295709 A1 | 10/2016 | Ahn |
| 2016/0378146 A1 | 12/2016 | Sprenger et al. |
| 2017/0061836 A1 | 3/2017 | Kim et al. |
| 2017/0075388 A1 | 3/2017 | Yee et al. |
| 2017/0115701 A1 | 4/2017 | Bae et al. |
| 2017/0260786 A1 | 9/2017 | Sprenger et al. |
| 2018/0110139 A1 | 4/2018 | Seo et al. |
| 2019/0041913 A1 | 2/2019 | Yeh |
| 2019/0174645 A1 * | 6/2019 | Jeon ........................ G09F 9/301 |
| 2019/0274227 A1 | 9/2019 | Hsu et al. |
| 2020/0192432 A1 | 6/2020 | Yee et al. |
| 2020/0267856 A1 | 8/2020 | Hsu |
| 2021/0026418 A1 * | 1/2021 | Park ........................ G09F 9/30 |
| 2021/0341972 A1 * | 11/2021 | Togashi ................ G06F 1/1652 |

FOREIGN PATENT DOCUMENTS

| | | |
|---|---|---|
| CN | 108646858 A | 10/2018 |
| CN | 109690662 A | 4/2019 |
| CN | 209430596 U | 9/2019 |
| JP | 3133691 U | 6/2007 |
| TW | 201938006 A | 9/2019 |
| WO | 2019/190213 A1 | 10/2019 |

OTHER PUBLICATIONS

Office Action dated Apr. 1, 2022.
International Search Report dated Mar. 15, 2021.
Notice of Allowance dated Aug. 25, 2022.

* cited by examiner

ELECTRONIC DEVICE INCLUDING SUPPLEMENTARY STRUCTURE

CROSS-REFERENCE TO RELATED APPLICATION(S)

This application is based on and claims priority under 35 U.S.C. § 119 to Korean Patent Application No. 10-2020-0000425, filed on Jan. 2, 2020, in the Korean Intellectual Property Office, the disclosure of which is incorporated by reference herein its entirety.

BACKGROUND

1. Field

The disclosure relates to an electronic device, and more particularly, to a foldable electronic device with a flexible display.

2. Description of Related Art

An electronic device (e.g., a smartphone) may include a display to display a variety of visual media and imagery. Furthermore, a flexible display may be used as the display of the electronic device to enable usage of a larger screen without losing portability.

The flexible display may be at least partially folded when the electronic device is set into a stowed configuration.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. There is a high risk of damage to the folding portion of the flexible display, relative to other portions of the flexible display. Accordingly, an aspect of the disclosure is to provide an electronic device including a supplementary structure for preventing damage to a flexible display.

Another aspect of the disclosure is to provide an electronic device including a supplementary structure for protecting a weak edge of a folding portion of a flexible display.

In accordance with an aspect of the disclosure, an electronic device includes a first housing, a second housing, a hinge structure a hinge structure foldably coupling at least part of the first housing with at least part of the second housing, to support folding and unfolding operations, a flexible display disposed over the first housing, the second housing, and the hinge structure, a hinge housing in which at least part of the hinge structure is seated, a first member disposed on at least part of a periphery of the first housing that is adjacent to at least part of the second housing when the first housing and the second are set in a flat unfolded state, a second member disposed on at least part of a periphery of the second housing that at least part of the first housing faces when the first housing and the second housing are set in the flat unfolded state, a supplementary structure at least partially fastened to an edge portion of the hinge housing to hide at least part of a peripheral edge of the flexible display, wherein the supplementary structure includes a fixing bracket coupled to the hinge housing, a first wing part coupled to the fixing bracket, and disposed between the first member and the first housing, a second wing part coupled to the fixing bracket, and disposed between the second member and the second housing, and a coupling part coupling the first wing part and the second wing part to the fixing bracket.

In accordance with another aspect of the disclosure, an electronic device includes a first housing, a second housing, a hinge structure connecting the first housing with the second housing and supporting folding and unfolding operations of the first housing and the second housing, a hinge housing disposed under the first housing and the second housing when the electronic device is set in an flat unfolded state, wherein at least part of the hinge structure is seated in the hinge housing, a flexible display disposed on the first housing, the second housing, and the hinge structure, and a supplementary structure coupled to an edge portion of the hinge housing, wherein at least part of the supplementary structure is disposed between an edge of the first housing, and an edge of the second housing when the electronic device is set in a folded state, and wherein a part of the supplementary structure extends beyond an upper surface of the display when the electronic device is set in the unfolded state.

In accordance with another aspect of the disclosure, an electronic device includes a first housing, a second housing, a hinge structure connecting at least part of the first housing with at least part of the second housing and support folding and unfolding operations, a flexible display disposed over the first housing, the second housing, and the hinge structure, a hinge housing in which at least part of the hinge structure is seated, a first member disposed on at least part of a periphery of the first housing, such that at least part of the second housing faces the first member when the electronic device is set in a flat unfolded state, a second member disposed on at least part of a periphery of the second housing, such that at least part of the first housing faces the second member when the electronic device is set in the flat unfolded state, and a supplementary structure coupled to at least part of an edge portion of the hinge housing, the supplementary structure hiding at least part of a peripheral edge of the flexible display, wherein at least part of the supplementary structure is slidable on rear surfaces of the first member and the second member, when the electronic device transitions from a folded state to the flat unfolded state, or from the flat unfolded state to the folded state.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments of the disclosure may be described with reference to accompanying drawings. Accordingly, those of ordinary skill in the art will recognize that modifications, equivalents, and/or alternatives on the certain embodiments described herein can be variously made without departing from the disclosure.

Figure 1A:
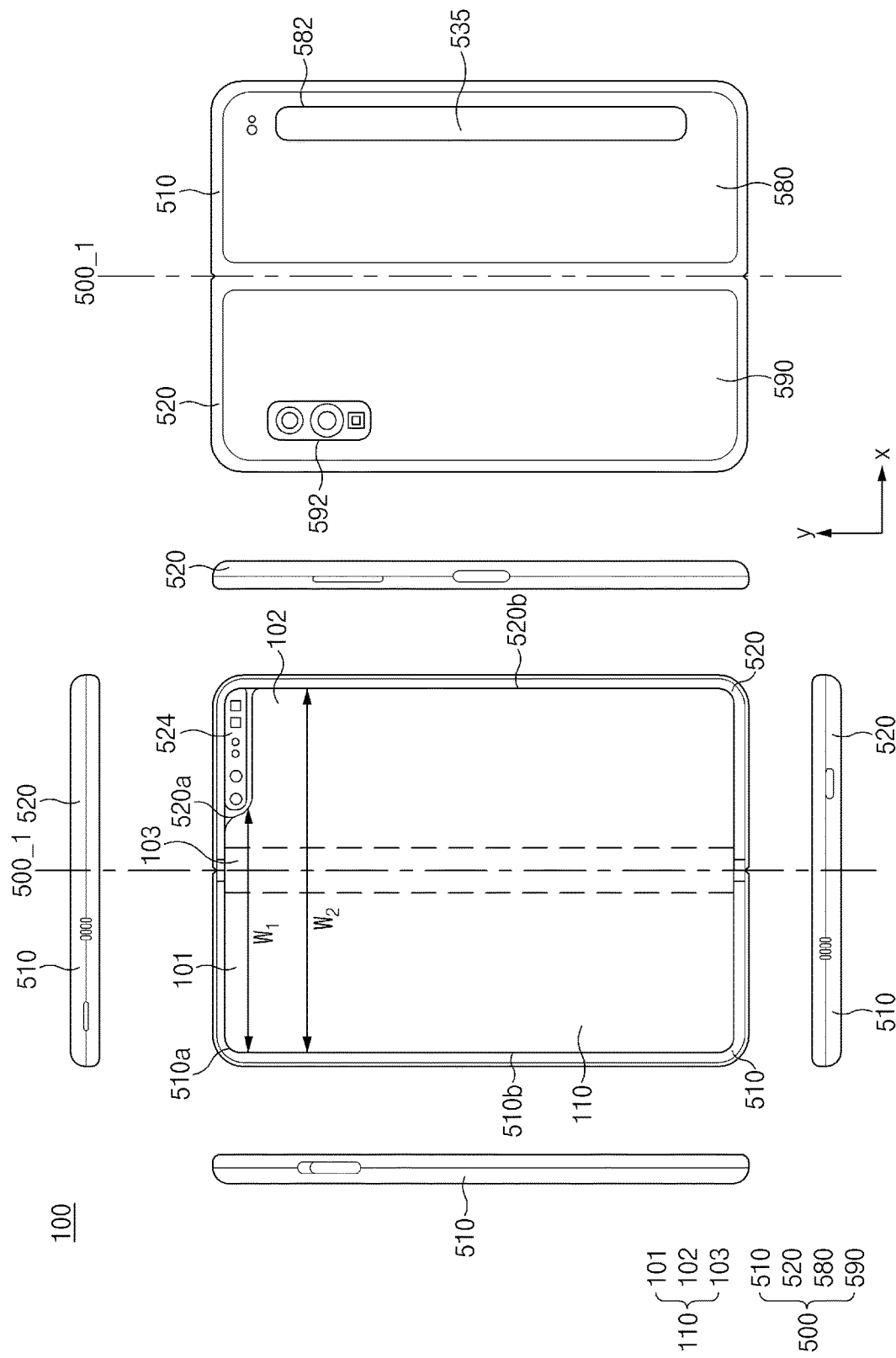
FIG. 1A is a view illustrating a flat state of an electronic device according to an embodiment.
Figure 1B:
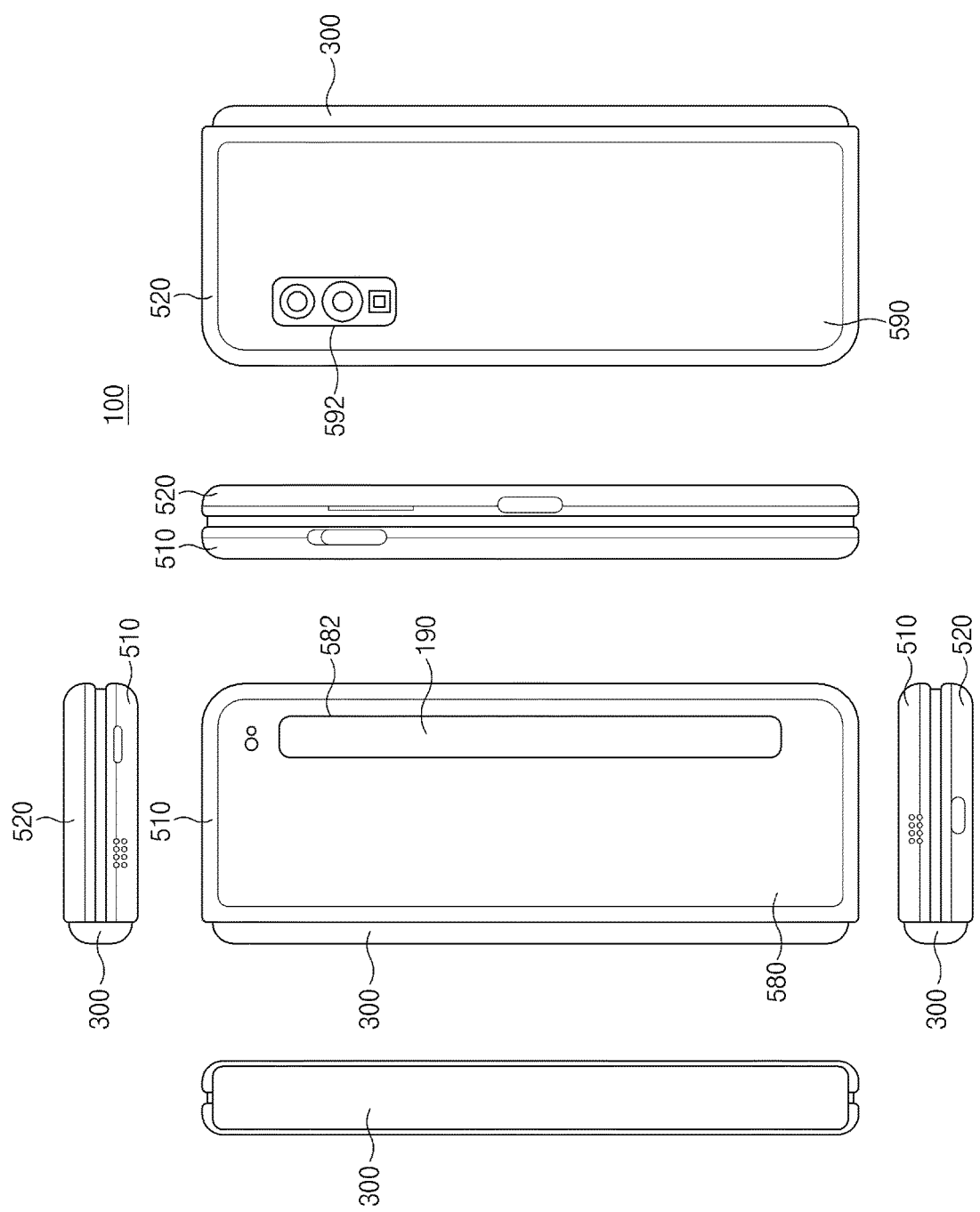
FIG. 1B is a view illustrating a folded state of the electronic device according to an embodiment.

FIG. 1A is a view illustrating a flat state of a foldable electronic device according to an embodiment. FIG. 1B is a view illustrating a folded state of the foldable electronic device according to an embodiment.

Referring to FIGS. 1A and 1B, in an embodiment, the electronic device 100 may include a foldable housing 500, a hinge housing 300 (or, a hinge cover) that covers a foldable portion of the foldable housing 500, and a flexible or foldable display 110 disposed in a space formed by the foldable housing 500 (e.g., when the foldable housing 500 is closed). In this disclosure, a surface on which the display 110 is disposed is defined as a first surface or a front surface of the electronic device 100. An opposite surface to the front surface is defined as a second surface or a rear surface of the electronic device 100. Surfaces that surround at least part of a space between the front surface and the rear surface are defined as third surfaces or side surfaces of the electronic device 100.

In an embodiment, the foldable housing 500 may include a first housing 510, a second housing 520 including a sensor area 524, a first back cover 580, and a second back cover 590. The foldable housing 500 of the electronic device 100 is not limited to the form and coupling illustrated in FIGS. 1A and 1B and may be implemented by a combination and/or coupling of other shapes or parts. For example, in another embodiment, the first housing 510 and the first back cover 580 may be integrally formed with each other, and the second housing 520 and the second back cover 590 may be integrally formed with each other.

In the illustrated embodiment, the first housing 510 and the second housing 520 may be disposed on opposite sides of a virtual folding axis 500_1 and may have shapes that are symmetrical to one another with respect to the folding axis 500_1. As will be described below, the angle between the first housing 510 and the second housing 520 or the distance from one point of the first housing 510 to one point of the second housing 520 may vary depending on whether the electronic device 100 is in a flat state, a folded state, or a specific mounting state. In the illustrated embodiment, unlike the first housing 510, the second housing 520 may additionally include the sensor area 524 in which various sensors are disposed. However, the first housing 510 and the second housing 520 may have mutually symmetrical shapes in the other areas thereof In an embodiment, as illustrated in FIG. 1A, the first housing 510 and the second housing 520 may form a recess in which the display 110 is accommodated. In the illustrated embodiment, due to the sensor area 524, the recess may have two or more different widths in a direction perpendicular to the folding axis 500_1.

For example, the recess may have (1) a first width $W_1$ between a first portion 510a of the first housing 510 that is parallel to the folding axis 500_1 and a first portion 520a of the second housing 520 that is formed on the periphery of the sensor area 524 and (2) a second width $W_2$ formed by a second portion 510b of the first housing 510 and a second portion 520b of the second housing 520 that does not correspond to the sensor area 524 and that is parallel to the folding axis 500_1. In this case, the second width $W_2$ may be greater than the first width $W_1$. In other words, the first portion 510a of the first housing 510 and the first portion 520a of the second housing 520 having mutually asymmetrical shapes may form the first width $W_1$ of the recess, and the second portion 510b of the first housing 510 and the second portion 520b of the second housing 520 having mutually symmetrical shapes may form the second width $W_2$ of the recess. In an embodiment, the first portion 520a and the second portion 520b of the second housing 520 may have different distances from the folding axis 500_1. The width of the recess is not limited to the illustrated example. In certain embodiments, the recess may have a plurality of widths depending on the form of the sensor area 524 or the asymmetrical portions of the first housing 510 and the second housing 520.

In an embodiment, at least part of the first housing 510 and at least part of the second housing 520 may be formed of a metallic material or a non-metallic material selected to have a stiffness sufficient to support the display 110. According to certain embodiments, a supplementary member (or, a member, a decorative member, or a decoration) may be disposed on the first housing 510 and the second housing 520.

In an embodiment, the sensor area 524 may have a predetermined area adjacent to one corner of the second housing 520. However, the arrangement, shape, and size of the sensor area 524 are not limited to the illustrated example. For example, in another embodiment, the sensor area 524 may be provided in another corner of the second housing 520 or in any area between an upper corner and a lower corner of the second housing 520. In an embodiment, parts embedded in the electronic device 100 to perform various functions may be exposed on the front surface of the electronic device 100 through the sensor area 524 or through one or more openings formed in the sensor area 524. In certain embodiments, the parts may include various types of sensors. The sensors may include, for example, at least one of a front camera, a receiver, or a proximity sensor.

The first back cover 580 may be disposed on one side of the folding axis 500_1 on the rear surface of the electronic device 100. The first back cover 580 may have, for example, a substantially rectangular periphery, and the periphery may be surrounded by the first housing 510. Similarly, the second back cover 590 may be disposed on an opposite side of the folding axis 500_1 on the rear surface of the electronic device 100. The second back cover 590 may have a periphery surrounded by the second housing 520.

In the illustrated embodiment, the first back cover 580 and the second back cover 590 may have substantially symmetrical shapes with respect to the folding axis 500_1. However, the first back cover 580 and the second back cover 590 are not required to have mutually symmetrical shapes. In another embodiment, the electronic device 100 may include the first back cover 580 and the second back cover 590 that have different shapes. In another embodiment, the first back cover 580 may be integrally formed with the first housing 510, and the second back cover 590 may be integrally formed with the second housing 520.

In an embodiment, the first back cover 580, the second back cover 590, the first housing 510, and the second housing 520 may form a space in which various parts (e.g., a printed circuit board or a battery) of the electronic device 100 are disposed. In an embodiment, one or more parts may be disposed, or visually exposed, on the rear surface of the electronic device 100. For example, at least part of a sub-display 535 may be visually exposed through a first rear area 582 of the first back cover 580. In another embodiment, one or more parts or sensors may be visually exposed through a second rear area 592 of the second back cover 590. In certain embodiments, the sensors may include a proximity sensor and/or a rear camera.

Referring to FIG. 1B, the hinge housing 300 may be disposed between the first housing 510 and the second housing 520 and may be configured to hide an internal part (e.g., a hinge structure). In an embodiment, the hinge housing 300 may be hidden by part of the first housing 510 and part of the second housing 520, or may be exposed to the outside environment, depending on a state (e.g., a flat state or an unfolded state, or a folded state) of the electronic device 100.

For example, when the electronic device 100 is in a flat state as illustrated in FIG. 1A, the hinge housing 300 may not be exposed to the outside environment by being hidden by the first housing 510 and the second housing 520. In another example, when the electronic device 100 is in a folded state (e.g., a fully folded state) as illustrated in FIG. 1B, the hinge housing 300 may be exposed to the outside environment from between the first housing 510 and the second housing 520. In another example, when the electronic device 100 is in an intermediate state in which the first housing 510 and the second housing 520 are folded with a certain angle, part of the hinge housing 300 may be exposed to the outside environment from between the first housing 510 and the second housing 520. However, in this case, the exposed area may be smaller than that when the electronic device 100 is in the fully folded state. In an embodiment, the hinge housing 300 may include a curved surface.

The display 110 may be disposed in the space formed by the foldable housing 500. For example, the display 110 may be mounted in the recess formed by the foldable housing 500 and may form a substantial portion of the front surface of the electronic device 100, which in some embodiments may be almost an entirety of the front surface.

Accordingly, the front surface of the electronic device 100 may include the display 110, and a partial area of the first housing 510 and a partial area of the second housing 520 that is adjacent to the display 110. Further, the rear surface of the electronic device 100 may include the first back cover 580, a partial area of the first housing 510 that is adjacent to the first back cover 580, the second back cover 590, and a partial area of the second housing 520 that is adjacent to the second back cover 590.

The display 110 may refer to a display, at least a partial area of which is able to be deformed into a flat surface or a curved surface. In an embodiment, the display 110 may include a folding area 103, a first area 101 disposed on one side of the folding area 103 (e.g., on a left side of the folding area 103 illustrated in FIG. 1A), and a second area 102 disposed on an opposite side of the folding area 103 (e.g., on a right side of the folding area 103 illustrated in FIG. 1A).

The areas of the display 110 illustrated in FIG. 1A are illustrative, and the display 110 may be divided into a plurality of areas (e.g., four or more areas, or two areas) depending on the structure or function of the display 110. For example, in the embodiment illustrated in FIG. 1A, the areas of the display 110 may be divided from each other by the folding area 103 extending parallel to the y-axis or by the folding axis 500_1. However, in another embodiment, the display 110 may be divided into areas with respect to another folding area (e.g., a folding area parallel to the x-axis) or another folding axis (e.g., a folding axis parallel to the x-axis).

The first area 101 and the second area 102 may have shapes that are entirely symmetrical to each other with respect to the folding area 103. However, unlike the first area 101, the second area 102 may include a notch that is cut depending on the presence of the sensor area 524, and in the other area, the second area 102 may have a shape that is symmetrical to the shape of the first area 101. In other words, the first area 101 and the second area 102 may include portions having mutually symmetrical shapes and portions having mutually asymmetrical shapes. According to certain embodiments, in a case where the sensor area 524 is disposed under the display 110, the first area 101 and the second area 102 may have symmetrical shapes.

Hereinafter, operations of the first housing 510 and the second housing 520 and the areas of the display 110 depending on states (e.g., a flat state and a folded state) of the electronic device 100 will be described.

In an embodiment, when the electronic device 100 is in a flat state (e.g., FIG. 1A), the first housing 510 and the second housing 520 may be disposed to face the same direction while forming an angle of 180 degrees. A surface of the first area 101 and a surface of the second area 102 of the display 110 may face the same direction (e.g., the direction toward the front surface of the electronic device 100) while forming an angle of 180 degrees. The folding area 103, together with the first area 101 and the second area 102, may form the same plane.

In an embodiment, when the electronic device 100 is in a folded state (e.g., FIG. 1B), the first housing 510 and the second housing 520 may be disposed to face each other. The surface of the first area 101 and the surface of the second area 102 of the display 110 may face each other while forming a narrow angle (e.g., an angle between 0 degrees and 10 degrees). At least part of the folding area 103 may be formed to be a curved surface having a predetermined curvature.

In an embodiment, when the electronic device 100 is in an intermediate state, the first housing 510 and the second housing 520 may be disposed to form a certain angle. The surface of the first area 101 and the surface of the second area 102 of the display 110 may form an angle that is greater than that in the folded state and is smaller than that in the flat state. At least part of the folding area 103 may be formed to be a curved surface having a predetermined curvature, and the curvature may be smaller than that in the folded state.

Figure 2:
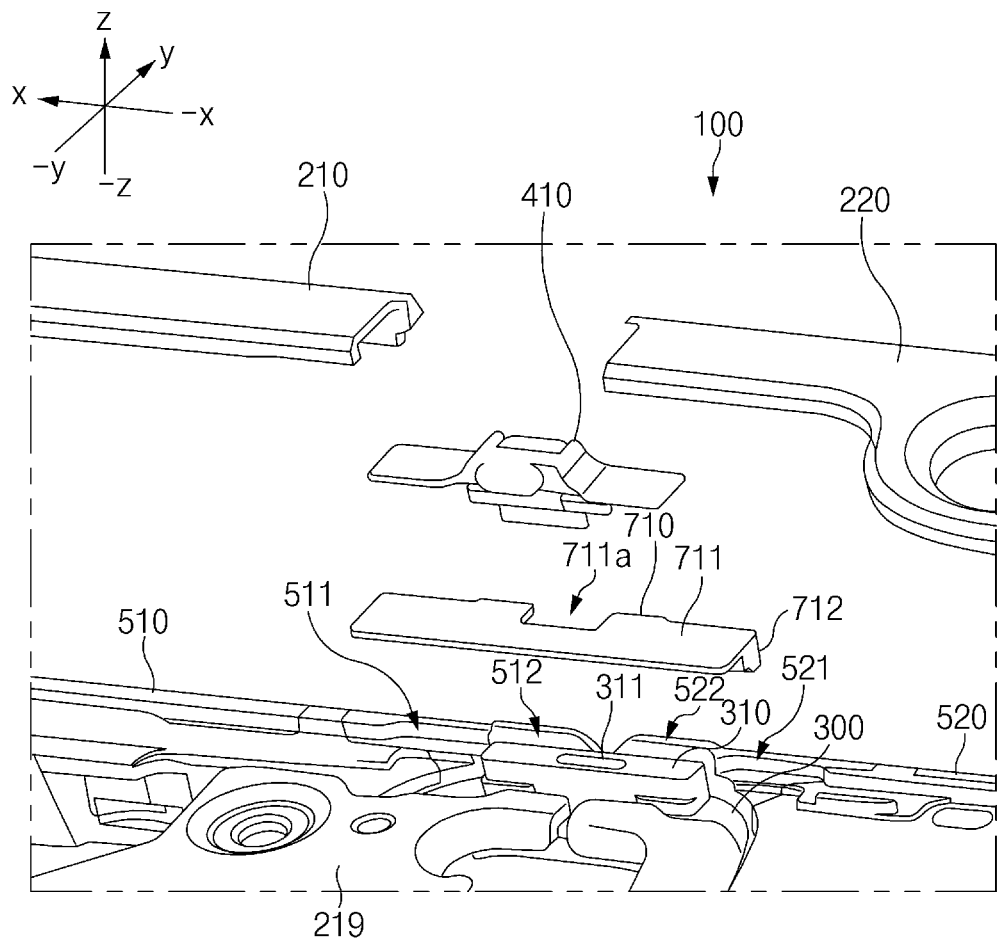
FIG. 2 is a view illustrating one example of an exploded partial shape of a folding area of FIG. 1A.

FIG. 2 is a view illustrating one example of an exploded partial shape of the folding area of FIG. 1A.

Referring to FIG. 2, at least part of the electronic device 100 may include the first housing 510, the second housing 520, the hinge housing 300, a first protective member 710, a first supplementary structure 410, a first supplementary member 210 (or, a first member, a first decorative member, or a first decoration), and a second supplementary member 220 (or, a second member, a second decorative member, or a second decoration). Additionally or alternatively, the at least part of the electronic device 100 may include a support plate 219 disposed to cover at least parts of upper surfaces of the hinge housing 300, the first housing 510, and the second housing 520, which face in the z-axis direction, in a flat unfolded state of the electronic device 100. The support plate 219 may include a first support plate disposed on part of the hinge housing 300 and the upper surface of the first housing 510 and a second support plate disposed on the remaining part of the hinge housing 300 and the upper surface of the second housing 520. When the electronic device 100 is in the flat state (e.g., the unfolded state), the first support plate and the second support plate may be disposed to face each other in the center of the hinge housing 300. According to certain embodiments, the support plate 219 may be provided in the form of a single panel formed in a lattice structure in which the central portion is foldable. At least part of the support part 219 may be formed of a metallic material.

The first housing 510, the second housing 520, and the hinge housing 300 may have the same structures as the housings and the hinge housing 300 described above with reference to FIGS. 1A and 1B. According to certain embodiments, the first housing 510 and the second housing 520 may include screen walls 512 and 522 extending to a predetermined height in the z-axis direction from y-axis edges thereof, that orient to face each other in the flat state of the electronic device 100. The screen walls 512 and 522 may reinforce a protrusion 310 of the hinge housing 300 and at least some of the first protective member 710 (or, a cover), the first supplementary structure 410, the first supplementary member 210, and the second supplementary member 220 that are disposed to cover at least part of the protrusion 310. For example, the screen walls 512 and 522 may serve to firstly resist pressure applied from the y-axis direction to the −y-axis direction or pressure of an object.

Part of the first supplementary structure 410 (e.g., at least part of a fixing bracket) may be fixedly inserted into a coupling recess 311 formed on one side of the protrusion 310 of the hinge housing 300. The coupling recess 311 and the part of the first supplementary structure 410 may be coupled to a predetermined degree of coupling tension (or greater than the predetermined degree). In this regard, the diameter of the coupling recess 311 may be equal to or smaller than the size of the part of the first supplementary structure 410, and the part of the first supplementary structure 410 may be press-fit into the coupling recess 311. Alternatively, an adhesive member having an adhesive force above a specified magnitude may be disposed between the coupling recess 311 and the part of the first supplementary structure 410. The adhesive member may bond the part of the first supplementary structure 410 to the coupling recess 311 such that the first supplementary structure 410 is difficult to separate from the coupling recess 311.

The first protective member 710 may be disposed to cover at least part of the protrusion 310 disposed on an edge of the hinge housing 300. At least part of the first protective member 710 may be formed of at least one of a rubber member, a polymer member, a silicone member, or a flexible plastic member. The first protective member 710 may include a cover body 711, a cover hole 711a (or, a recess), and a barrier 712.

The cover body 711 may have a size covering at least part of a y-axis edge of the hinge housing 300. For example, the cover body 711 may be disposed to cover at least part of an upper surface of the protrusion 310 of the hinge housing 300 that faces in the z-axis direction. At least part of the cover body 711 may have a predetermined length and width in the x-axis direction to cover at least part of a portion where the first housing 510 and the second housing 520 face each other in the flat state of the electronic device 100. Alternatively, at least part of the cover body 711 may have a predetermined length and width in the x-axis direction to cover at least part of a gap between the first housing 510 and the display 110 and at least part of a gap between the second housing 520 and the display 110. In another case, at least part of the cover body 711 may have a predetermined length and width in the x-axis direction to cover at least part of a gap between the hinge housing 300 and the display 110. At least part of the first supplementary structure 410 may be placed on an upper surface of the cover body 711 that faces in the z-axis direction. Furthermore, at least part of the first supplementary member 210 and at least part of the second supplementary member 220 may be placed on opposite sides of the upper surface of the cover body 711 that faces in the z-axis direction.

The cover hole 711a may be formed by removing one side of the cover body 711 such that at least part of the coupling recess 311 formed on a central portion of the protrusion 310 is exposed through the cover hole 711a. The size of the cover hole 711a may vary depending on the size of the coupling recess 311. Part of the first supplementary structure 410 may contact an inner surface of the cover hole 711a.

The barrier 712 may extend by a predetermined length in the −z-axis direction while forming a predetermined angle (e.g., 90 degrees) with the cover body 711. The barrier 712 may extend in the −z-axis direction from an edge of the cover body 711 that is adjacent to the screen walls 512 and 522. The barrier 712 may be disposed in a first seating space 511 formed in the first housing 510 (or, a first gap formed between the first housing 510 and the display 110) and a second seating space 521 formed in the second housing 520 (or, a second gap formed between the second housing 520 and the display 110) and may block infiltration of foreign matter from the outside environment. According to certain embodiments, the barrier 712 may prevent a side surface of the display 110 from being damaged by a collision with a sidewall of the hinge housing 300 while being pushed or moved in the y-axis direction when an external impact is applied to the electronic device 100.

The first supplementary member 210 may be disposed to cover at least part of the upper surface of the first housing 510 that faces the z-axis direction. The first supplementary member 210 may serve to reinforce the peripheral edge of the display 110 placed on the first housing 510. The first supplementary member 210 may have a shape (e.g., the shape of "C") appropriate to be disposed on the remaining side surfaces of the first housing 510 other than the side surface facing the second housing 520. The first supplementary member 210 may be spaced apart from the second supplementary member 220 at a predetermined interval.

The second supplementary member 220 may be disposed to cover at least part of the upper surface of the second housing 520 that faces in the z-axis direction. The second supplementary member 220 may serve to reinforce the peripheral edge of the display 110 placed on the second housing 520. The second supplementary member 220 may have a shape (e.g., the shape of "C") that is appropriate to be disposed on the remaining side surfaces of the second housing 520 other than the side surface facing the first housing 510. The second supplementary member 220 may be spaced apart from the first supplementary member 210 at the predetermined interval. The second supplementary member 220 may have a shape similar to the shape of the first supplementary member 210. Alternatively, in consideration of the sensor area 524 described above with reference to FIG. 1A, the second supplementary member 220 may further include a portion protruding in the −y-axis direction in which the display 110 is disposed.

Figure 3:
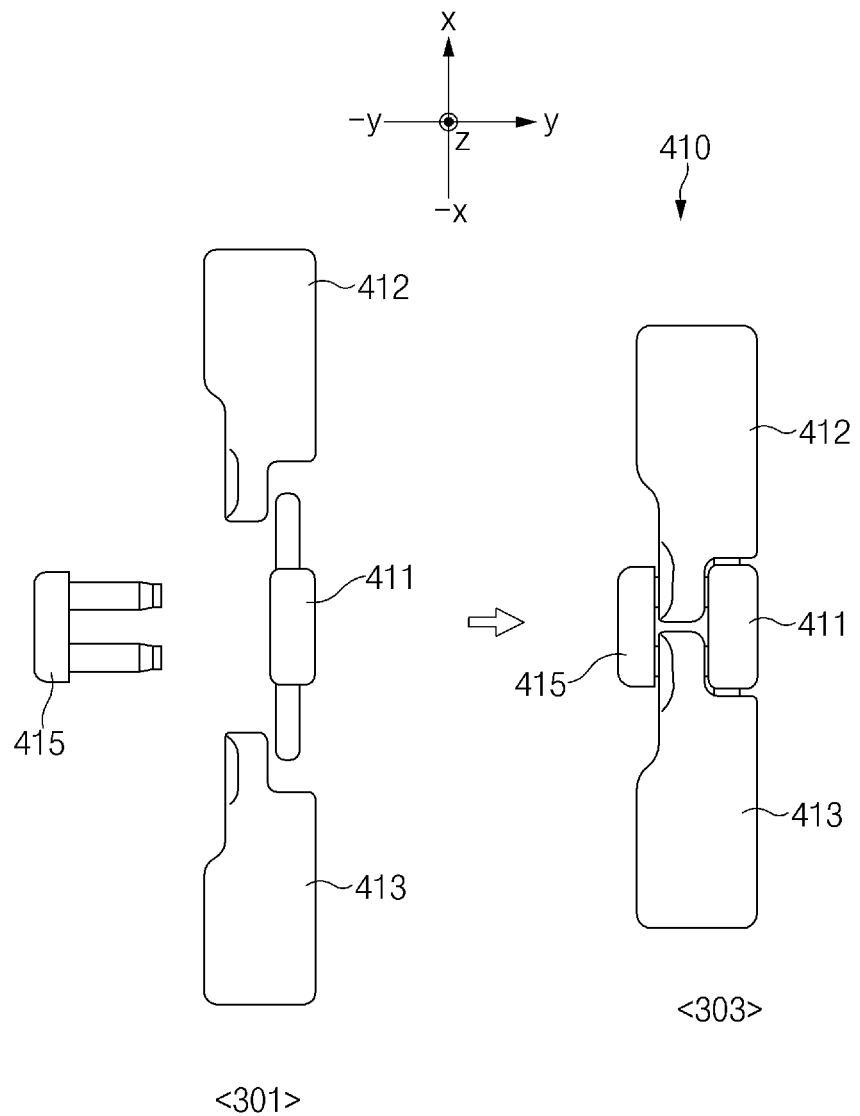
FIG. 3 is a view illustrating disassembled and assembled states of a supplementary structure according to an embodiment.
Figure 4:
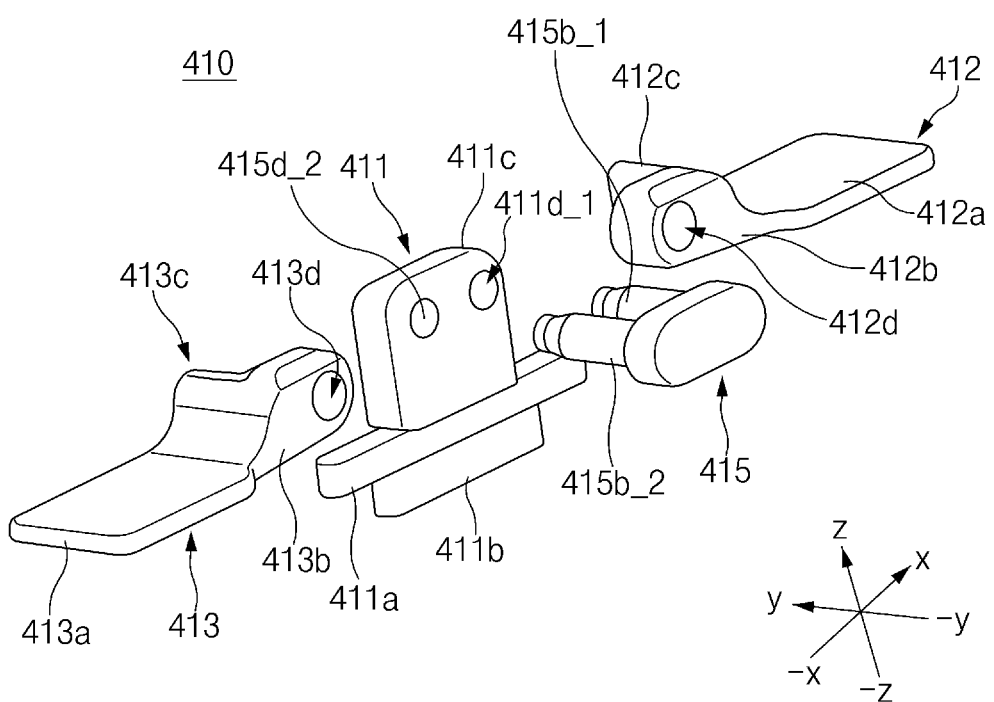
FIG. 4 is an exploded perspective view of the supplementary structure according to an embodiment.

FIG. 3 is a view illustrating disassembled and assembled states of the supplementary structure according to an embodiment, and FIG. 4 is an exploded perspective view of the supplementary structure according to an embodiment.

Referring to FIGS. 3 and 4, as in state 301, the first supplementary structure 410 according to an embodiment may include a fixing bracket 411, a first wing part 412 (or, a first part), a second wing part 413 (or, a second part), and a coupling part 415. As in state 303, the first wing part 412 and the second wing part 413 may be arranged on one side of the fixing bracket 411. The coupling part 415 may couple holes formed in the fixing bracket 411 and the first wing part 412 and may couple holes formed in the fixing bracket 411 and the second wing part 413. The first wing part 412 and the second wing part 413 may rotate about coupling pins 415b_1 and 415b_2 of the coupling part 415, which are coupled to the fixing bracket 411, within a predetermined angle range between the z-axis and the −z-axis.

At least part of the first supplementary structure 410 may be formed of a metallic member. According to an embodiment, at least part of the first supplementary structure 410 may be formed of a metallic material, such as stainless steel (STS), aluminum, magnesium, or the like, which may be resistant to oxidation (e.g., rust).

One side of the fixing bracket 411 may be inserted into the coupling recess 311 formed on the protrusion 310 of the hinge housing 300 and may be fixed by the hinge housing 300. At least part of the fixing bracket 411 inserted into the coupling recess 311 may have a cross-section larger than or equal to the cross-section of the coupling recess 311. The at least part of the fixing bracket 411 may be fixedly inserted into the coupling recess 311 by press-fit (e.g., by a method of pressing the fixing bracket 411 by tapping the fixing bracket 411, or by applying pressure above a specified magnitude to the fixing bracket 411). Alternatively, the at least part of the fixing bracket 411 inserted into the coupling recess 311 may be firmly bonded and fixed to the coupling recess 311 by an adhesive member disposed in the coupling recess 311. Accordingly, the first supplementary structure 410 may be fixed so as to be difficult to separate from the coupling recess 311. The fixing bracket 411 may be connected with the first wing part 412 and the second wing part 413 through the coupling part 415. In this regard, the fixing bracket 411 may include a central bracket portion 411a, a bracket extension 411b, a bracket hole body 411c, a first bracket hole 411d_1, and a second bracket hole 411d_2.

The central bracket portion 411a may have a larger size than the coupling recess 311 of the hinge housing 300. At least part of a lower surface (e.g., a surface facing in the −z-axis direction) of the central bracket portion 411a may be disposed to face the upper surface of the protrusion 310 on which the coupling recess 311 is formed. For example, the central bracket portion 411a may have a width similar to the width of the bracket extension 411b and smaller than the width of the bracket hole body 411c. The bracket extension 411b may extend to a predetermined depth in the −z-axis direction from the surface of the central bracket portion 411a that faces the −z-axis direction. The depth of the bracket extension 411b in the −z-axis direction may be smaller than or equal to the depth of the coupling recess 311. The overall size of the bracket extension 411b may be smaller than the overall size of the central bracket portion 411a. According to an embodiment, at least a partial cross-section of the bracket extension 411b may be formed to be the same as, or similar to, the cross-section of the coupling recess 311.

The bracket hole body 411c may extend from the central bracket portion 411a in the z-axis direction. The width (i.e., the thickness in the y-axis direction) of the bracket hole body 411c may be greater than the width (i.e., the thickness in the y-axis direction) of the central bracket portion 411a. The bracket hole body 411c may have a shorter length in the x-axis direction than the central bracket portion 411a or the bracket extension 411b. The bracket hole body 411c may have the bracket holes 411d_1 and 411d_2 formed therein in the y-axis direction and the −y-axis direction.

On one side of the bracket hole body 411c, the first bracket hole 411d_1 may be formed through the bracket hole body 411c in the y-axis direction and the −y-axis direction. The first bracket hole 411d_1 may be formed in the upper right-hand corner of the bracket hole body 411c. The diameter of the first bracket hole 411d_1 may correspond to the thickness of the first coupling pin 415b_1 of the coupling part 415. Alternatively, the diameter of the first bracket hole 411d_1 may correspond to the diameter of a first wing hole 412d formed in the first wing part 412.

The second bracket hole 411d_2 may be formed on one side of the bracket hole body 411c. The second bracket hole 411d_2 may be spaced apart from the first bracket hole 411d_1 at a predetermined interval and may be disposed side by side with the first bracket hole 411d_1 on the x-axis. The second bracket hole 411d_2 may be formed in the same direction as the first bracket hole 411d_1. The diameter of the second bracket hole 411d_2 may correspond to the diameter of a second wing hole 413d of the second wing part 413, or the size of the second coupling pin 415b_2 of the coupling part 415.

The first wing part 412 may include a first rotary portion 412a disposed in a space formed between the first supplementary member 210 and the first housing 510, a first extension 412b extending from the first rotary portion 412a in the −x-axis direction, a first support 412c extending from the first extension 412b in the y-axis direction, and the first wing hole 412d formed in the first extension 412b. The first wing hole 412d may be aligned with the first bracket hole 411d_1 in the y-axis direction and may be fixed to the bracket hole body 411c by the first coupling pin 415b_1 of the coupling part 415. One surface of the first support 412c may be disposed to face a side surface of the bracket hole body 411c, which itself faces 0 the x-axis direction, and a surface of the first extension 412b that faces in the y-axis direction may be disposed to face a surface of the bracket hole body 411c, which itself faces the −y-axis direction. The first support 412c and the first extension 412b may form the shape of "L".

The second wing part 413 may include a second rotary portion 413a disposed in a space formed between the second supplementary member 220 and the second housing 520, a second extension 413b extending from the second rotary portion 413a in the x-axis direction, a second support 413c extending from the second extension 413b in the y-axis direction, and the second wing hole 413d formed in the second extension 413b. The second wing hole 413d may be aligned with the second bracket hole 411d_2 in the y-axis direction and may be fixed to the bracket hole body 411c by the second coupling pin 415b_2 of the coupling part 415. The second support 413c of the second wing part 413 may be disposed to face a side surface of the bracket hole body 411c that faces in the −x-axis direction, and a surface of the second extension 413b that faces in the y-axis direction may be disposed to face the surface of the bracket hole body 411c that faces in the −y-axis direction.

Figure 5:
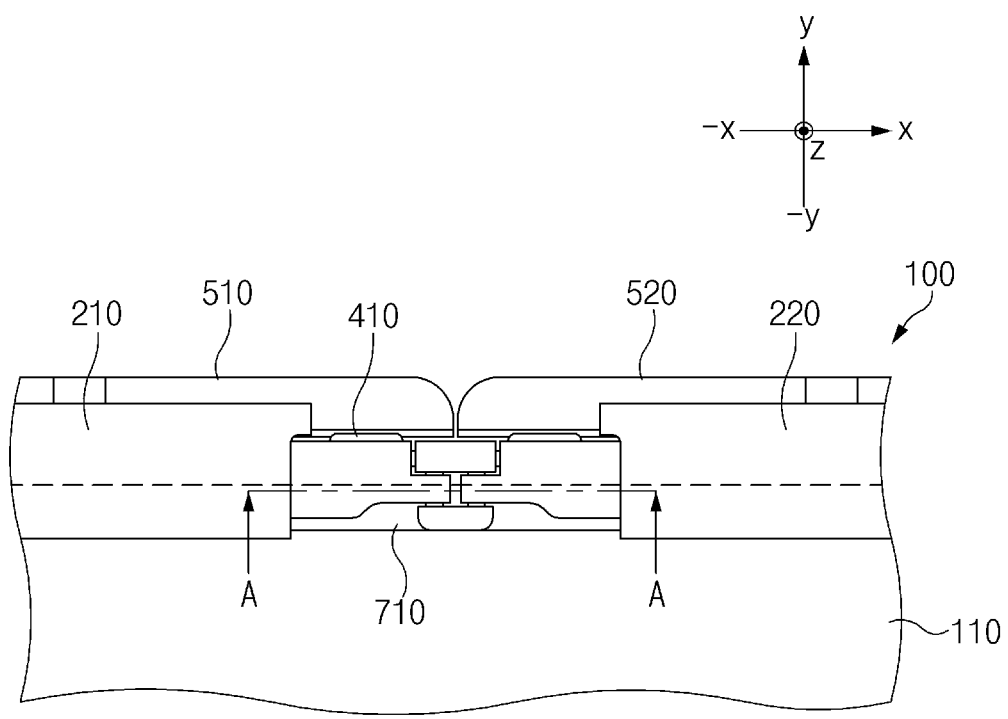
FIG. 5 is a view illustrating a partial area of the electronic device having the supplementary structure coupled thereto according to an embodiment.
Figure 6A:
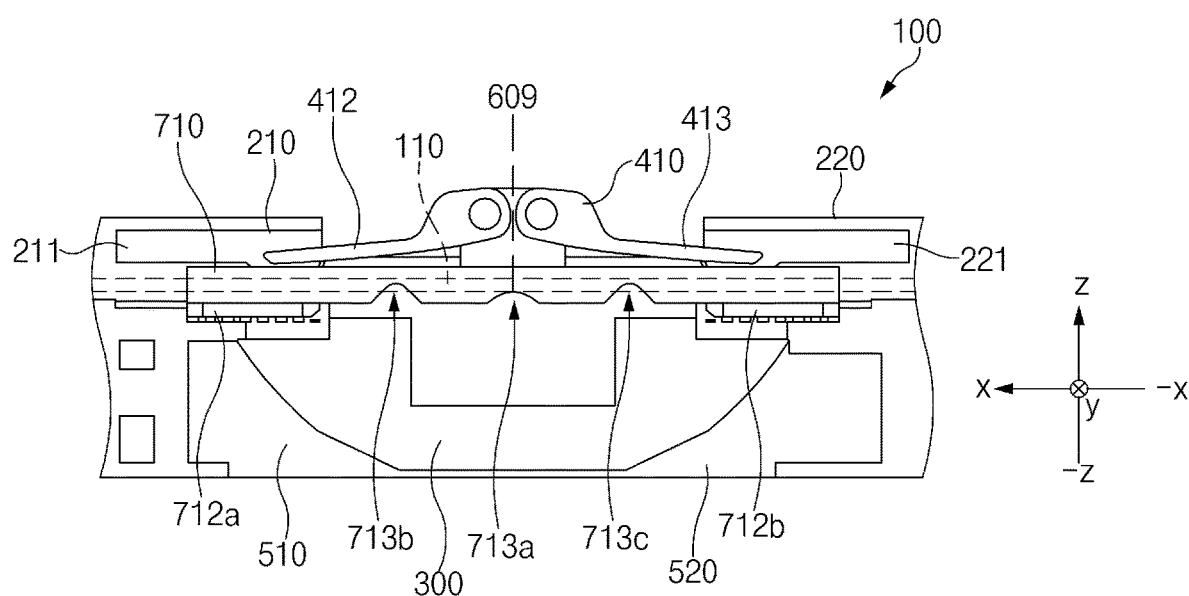
FIG. 6A is a view illustrating one example of a section taken along line A-A' of FIG. 5.
Figure 6B:
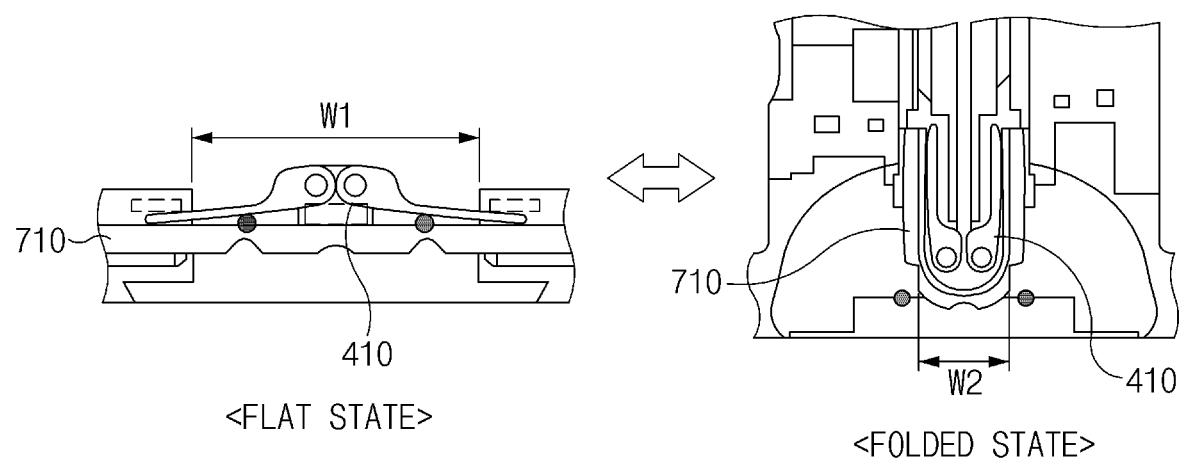
FIG. 6B is a view illustrating a change of the supplementary structure in flat and folded states of the electronic device according to an embodiment.
Figure 7:
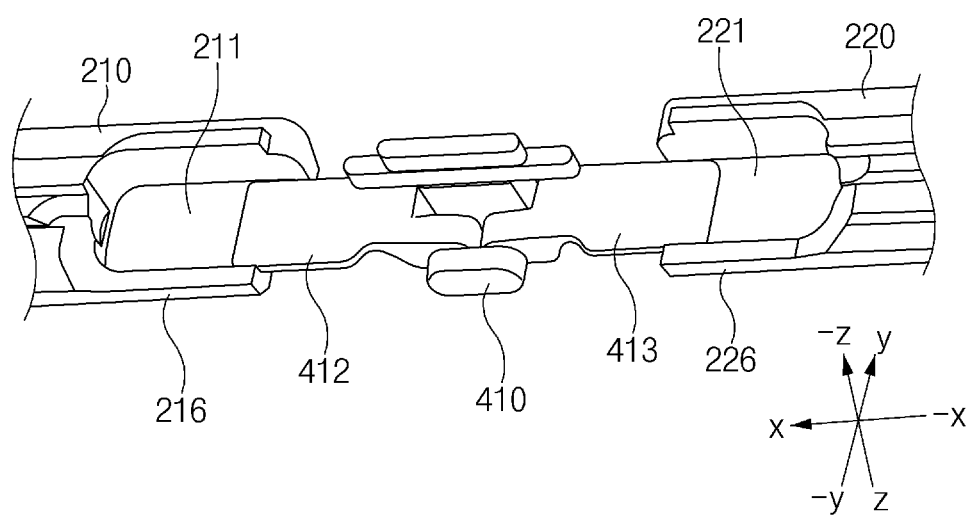
FIG. 7 is a view illustrating one example of internal shapes of the supplementary structure and supplementary members of FIG. 5.

FIG. 5 is a view illustrating a partial area of the electronic device having the supplementary structure coupled thereto according to an embodiment. FIG. 6A is a view illustrating one example of a section taken along line A-A' of FIG. 5. FIG. 6B is a view illustrating a change of the supplementary structure in flat and folded states of the electronic device according to an embodiment. FIG. 7 is a view illustrating one example of internal shapes of the supplementary structure and the supplementary members of FIG. 5.

Referring to FIGS. 5 to 7, at least part of the electronic device 100 may include the first housing 510, the second housing 520, the hinge housing 300, the first supplementary member 210, the second supplementary member 220, the first protective member 710, and the display 110. Additionally or alternatively, at least one plate may be additionally disposed between the display 110 and the hinge housing 300 (or, between the first housing 510 and the second housing 520 and the upper surface of the hinge housing 300 that faces the z-axis direction).

The x-axis edge of the first housing 510 and the −x-axis edge of the second housing 520 may be disposed to face each other in the flat state (e.g., unfolded state) of the electronic device 100. The first supplementary member 210 and the second supplementary member 220 may be disposed to face each other with a predetermined interval therebetween in the flat state of the electronic device 100.

At least part of the first wing part 412 of the first supplementary structure 410 may be seated on the first supplementary member 210, and the first supplementary member 210 may include a first sliding room (e.g., sliding space) 211 for accommodating a movement of the first wing part 412 in a process of rotation. In this regard, the first supplementary member 210 may include a cavity in the z-axis direction. To prevent the seated first wing part 412 from being separated from the first sliding room 211, the first supplementary member 210 may include a first separation prevention rib 216 supporting at least part of a side surface of the first wing part 412. The first separation prevention rib 216 may have a predetermined length in the x-axis direction and a predetermined height in the −z-axis direction. Accordingly, the first sliding room 211 may be provided in a step shape that is at least partially open in the −x-axis direction. According to certain embodiments, the length of the first wing part 412 located in the first sliding room 211 when the electronic device 100 is in the flat state may be one-sixth to one-fifth of the length of the first wing part 412 located in the first sliding room 211 when the electronic device 100 is in the folded state. According to certain embodiments, when the electronic device 100 is in the folded state, 50% or more (or, 80% or more) of the entire area of the first wing part 412 may be disposed within the first sliding room 211, and when the electronic device 100 is in the flat state, the size of an area of the first wing part 412 indisposed within the first sliding room 211 may be less than 30% (or, less than 20%) of the entire area of the first wing part 412. The first wing part 412 may perform a link operation (or, a rotary operation) while the size of the area located in the first sliding room 211 is changed during a change of the electronic device 100 from the folded state to the flat state.

The second supplementary member 220 may include a second sliding room 221 (e.g., a sliding space) for accommodating a movement of at least part of the second wing part 413 of the first supplementary structure 410 during an unfolding operation or a folding operation of the electronic device 100. In this regard, similarly to the first supplementary member 210, the second supplementary member 220 may include a cavity in the z-axis direction. To prevent the seated second wing part 413 from being separated from the second sliding room 221, the second supplementary member 220 may include a second separation prevention rib 226 supporting at least part of a side surface of the second wing part 413. The second separation prevention rib 226 may have a predetermined length in the −x-axis direction and a predetermined height in the −z-axis direction. Accordingly, the second sliding room 221 may be provided in a step shape that is open in the x-axis direction. The second sliding room 221 may be disposed to be symmetrical to the first sliding room 211 with respect to the first supplementary structure 410. According to certain embodiments, similarly to the first sliding room 211, the second sliding room 221 may have a predetermined size such that the size of an area of the second wing part 413 mounted in the second sliding room 221 is changed while the second wing part 413 performs a link operation (or, a rotary operation). Accordingly, the length of the second wing part 413 located in the second sliding room 221 when the electronic device 100 is in the flat state may be one-sixth to one-fifth of the length of the second wing part 413 located in the second sliding room 221 when the electronic device 100 is in the folded state. Alternatively, when the electronic device 100 is in the folded state, the second wing part 413 may be symmetrical to the first wing part 412, and 50% or more (or, 80% or more) of the entire area of the second wing part 413 may be located in the second sliding room 221, and when the electronic device 100 is in the flat state, the second wing part 413 located in the second sliding room 221 may be symmetrical to the first wing part 413, and less than 30% (or, less than 20%) of the entire area of the second wing part 413 may be located in the second sliding room 221. The second wing part 413 may perform a link operation (or, a rotary operation) symmetrically with the first wing part 412 while the size of the area located in the first sliding room 221 is changed during a change of the electronic device 100 from the folded state to the flat state.

According to certain embodiments, as illustrated in FIG. 6B, when the electronic device 100 is in the flat state, at least part of the first supplementary structure 410 may be disposed parallel to the protective member 710. When the electronic device 100 is in the folded state, the protective member 710 may be bent in the shape of "U", and the first wing part 412 and the second wing part 413 of the first supplementary structure 410 may be rotated to form the shape of "U" similarly to the protective member 710.

The first protective member 710 may be disposed under at least part of the first supplementary structure 410. Furthermore, the first protective member 710 may be disposed over at least part of the hinge housing 300. The first protective member 710 may include one or more slits 713a, 713b, and 713c so as to be bent without deformation or damage while being bent depending on rotary operations of the first housing 510 and the second housing 520. For example, the first protective member 710 may be bent with a predetermined curvature through the one or more slits 713a, 713b, and 713c during the rotary operations of the first housing 510 and the second housing 520, thereby reducing impact applied to the display 110. Furthermore, the first protective member 710 may be bent with a curvature corresponding to bending of the housings 510 and 520 through the above-described slits 713a, 713b, and 713c, thereby reducing a gap between the display 110 and the first protective member 710, and thus infiltration of foreign matter may be reduced. The one or more slits 713a, 713b, and 713c may include the first slit 713a disposed on a central portion of the first protective member 710, and the second slit 713b and the third slit 713c disposed on opposite sides of the first slit 713a so as to be to be spaced apart from the first slit 713a at a predetermined interval. According to an embodiment, the first slit 713a may be located on a virtual center line 609 of the first supplementary structure 410. The virtual center line 609 may include the center between the first wing part 412 and the second wing part 413 of the first supplementary structure 410. The second slit 713b may be disposed to be biased in the x-axis direction relative to the center of rotation of the first wing part 412. The third slit 713c may be disposed to be biased in the −x-axis direction relative to the center of rotation of the second wing part 413. Alternatively, the gap between the first slit 713a and the second slit 713b may be greater than the distance from the virtual center line 609 of the first supplementary structure 410 to the first wing part 412. Similarly, the gap between the first slit 713a and the third slit 713c may be greater than the distance from the virtual center line 609 of the first supplementary structure 410 to the second wing part 413.

The first protective member 710 may include a first barrier 712a and a second barrier 712b disposed on one side thereof in the −z-axis direction. The first barrier 712a and the second barrier 712b may be disposed in a seating space (e.g., the first seating space 511 of FIG. 2) that is formed in the first housing 510 and a seating space (e.g., the second seating space 521 of FIG. 2) that is formed in the second housing 520, respectively, and may block infiltration of at least part of foreign matter into the housings 510 and 520.

As the first supplementary structure 410 is disposed at the y-axis edge of the folding area of the display 110 as described above, the first supplementary structure 410 may reduce the gap between the display 110 and the hinge housing 300 and may block access of an object to the y-axis edge of the display 110 from outside the housings 510 and 520. Accordingly, the first supplementary structure 410 according to an embodiment may prevent the display 110 from being damaged or contaminated. Furthermore, the first protective member 710 may shield at least part of the gap between the housings 510 and 520 and the display 110 or between the hinge housing 300 and the display 110, thereby blocking infiltration of at least part of foreign matter into the electronic device 100 from the outside environment.

Figure 8:
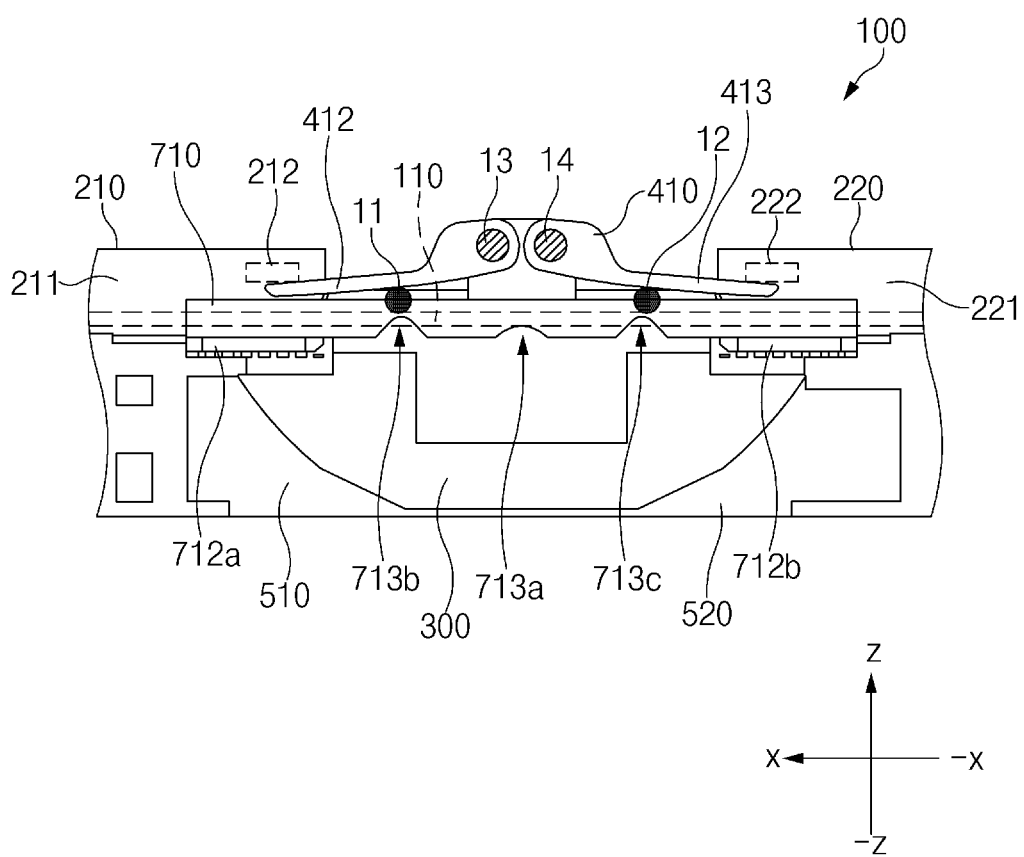
FIG. 8 is a view illustrating a space for rotation of the supplementary structure according to an embodiment.
Figure 9:
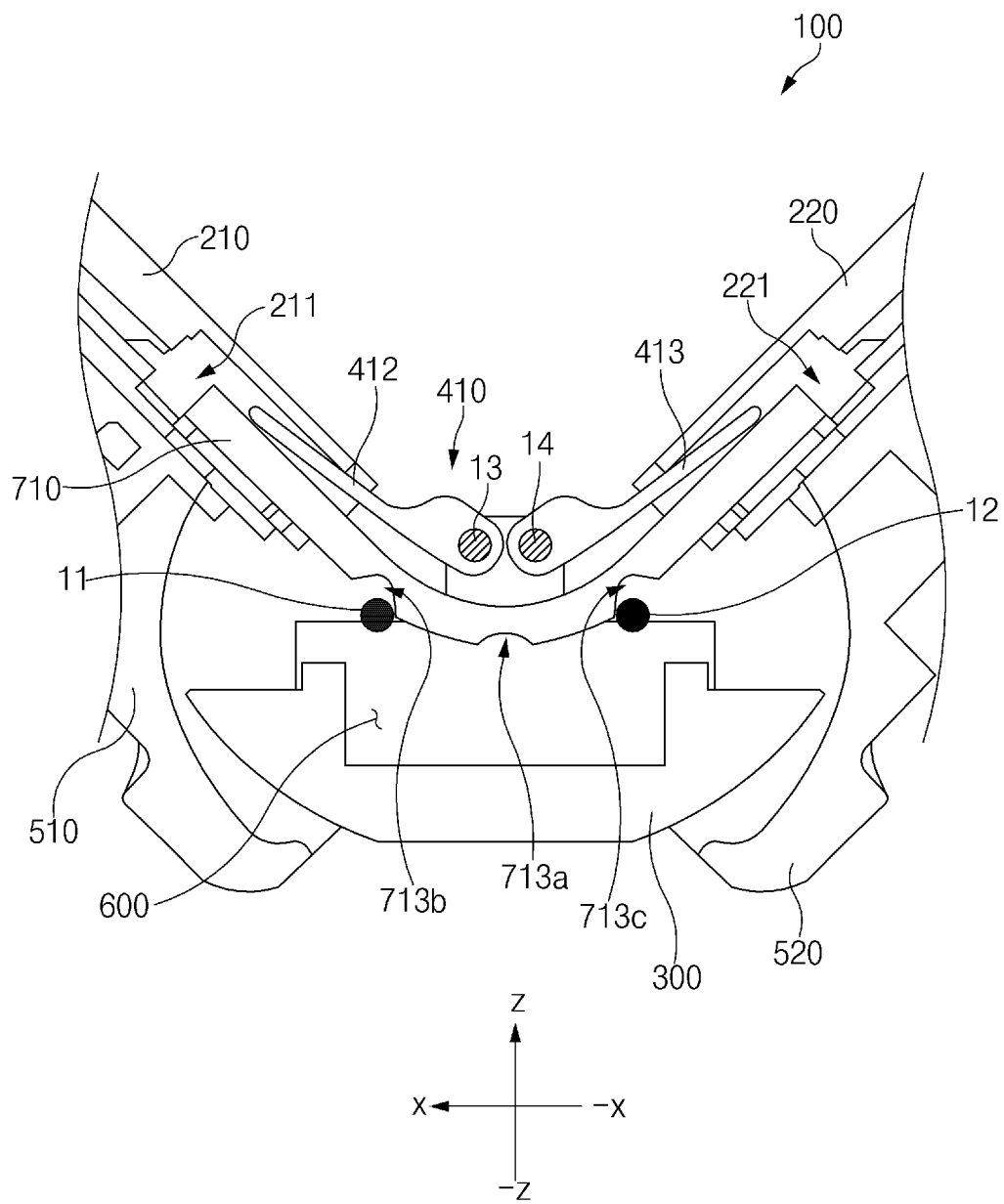
FIG. 9 is a view illustrating one example of a rotated state of the supplementary structure according to an embodiment.

FIG. 8 is a view illustrating a space for rotation of the supplementary structure according to an embodiment, and FIG. 9 is a view illustrating one example of a rotated state of the supplementary structure according to an embodiment.

Referring to FIGS. 8 and 9, the electronic device 100 may include the first housing 510, the second housing 520, the hinge housing 300, and at least one hinge structure 600. The first housing 510 and the second housing 520 may be connected to the hinge housing 300, and at least part of the at least one hinge structure 600 supporting hinge operations of the first housing 510 and the second housing 520 may be disposed in the hinge housing 300. The hinge structure 600 may include, for example, a first structure that is fastened with the first housing 510, and rotates about a first axis 11 (e.g., a virtual axis facing in the y-axis direction) and a second structure that is fastened with the second housing 520 and that rotates about a second axis 12 (e.g., a virtual axis that faces in the y-axis direction and that is spaced apart from the first axis 11 at a predetermined interval in the x-axis direction and disposed parallel to the first axis 11).

While the first housing 510 and the second housing 520 rotate in the z-axis direction, the first housing 510 may rotate about the first axis 11, and the second housing 520 may rotate about the second axis 12. The first axis 11 and the second axis 12 may be formed above the upper surface (e.g., the surface facing in the z-axis direction) of the hinge housing 300 in the z-axis direction when the electronic device 100 is in a flat state. Alternatively, the first axis 11 and the second axis 12 may be formed between the display 110 and the first protective member 710. The first axis 11 and the second axis 12 may be formed to be spaced apart from each other. For example, the distance between the first axis 11 and the second axis 12 may be shorter than the length of the upper surface (e.g., the surface facing in the z-axis direction) of the hinge housing 300 in the x-axis direction.

As mentioned above, the first wing part 412 and the second wing part 413 of the first supplementary structure 410 may be fastened with the fixing bracket 411 through the coupling pins 415_1 and 415_2 of the coupling part 415. Accordingly, as illustrated, the first wing part 412 may rotate about a third axis 13 in the z-axis direction or −z-axis direction, and the second wing part 413 may rotate about a fourth axis 14 in the z-axis direction or −z-axis direction. The third axis 13 and the fourth axis 14 may be formed above the first axis 11 and the second axis 12 with respect to the z-axis irrespective of a flat state or a folded state of the electronic device 100. The distance between the third axis 13 and the fourth axis 14 in the x-axis direction may be shorter than the distance between the first axis 11 and the second axis 12 in the x-axis direction. According to an embodiment, the third axis 13 and the fourth axis 14 may correspond to central portions of the coupling pins 415b_1 and 415b_2.

The first wing part 412 of the first supplementary structure 410 may be at least partially disposed in the first sliding room 211 provided in the first supplementary member 210. Accordingly, one end of the first wing part 412 may be located under the first supplementary member 210 in the −z-axis direction when the electronic device 100 is in the flat state. Similarly, the second wing part 413 may be at least partially disposed in the second sliding room 221 provided in the second supplementary member 220. Accordingly, one end of the second wing part 413 may be located under the second supplementary member 220 in the −z-axis direction when the electronic device 100 is in the flat state. In this state, a first gap 212 may be formed between the one end of the first wing part 412 and a surface of the first supplementary member 210 that faces in the −z-axis direction, and a second gap 222 may be formed between the one end of the second wing part 413 and a surface of the second supplementary member 220 that faces in the −z-axis direction. The first gap 212 may serve as an extra space for preventing contact (or, friction) of the first wing part 412 with one side (e.g., an edge facing in the −x-axis direction) of the first supplementary member 210 while the first wing part 412 moves into the first sliding room 211. Identically, the second gap 222 may prevent contact of the second wing part 413 with an end (e.g., an edge facing in the x-axis direction) of the second supplementary member 220 while the second wing part 413 moves into the second sliding room 221. The sizes of the first gap 212 and the second gap 222 described above may be differently formed by at least one of the magnitudes of slopes formed by the first wing part 412 and the second wing part 413 in the z-axis direction based on the x-axis or the thicknesses of the first wing part 412 and the second wing part 413.

The first protective member 710 may be bent in the shape of "U" in response to hinge operations of the first housing 510 and the second housing 520. At least part of the first protective member 710 may be formed of an elastic material such as a rubber member, a polymer, or silicone. As illustrated in FIG. 9, the first protective member 710 may include the plurality of slits 713a, 713b, and 713c. While the first housing 510 and the second housing 520 perform hinge operations to form an internal angle of 180 degrees or less in the z-axis direction, the plurality of slits 713a, 713b, and 713c may become wider to distribute pressure applied by the hinge operations. Accordingly, openings of the slits 713a, 713b, and 713c that face in the −z-axis direction may become larger while the electronic device 100 is folded and may become smaller while the electronic device 100 is unfolded. The first protective member 710 may be located above the first axis 11 and the second axis 12 in the z-axis direction while the electronic device 100 is being folded.

Figure 10:
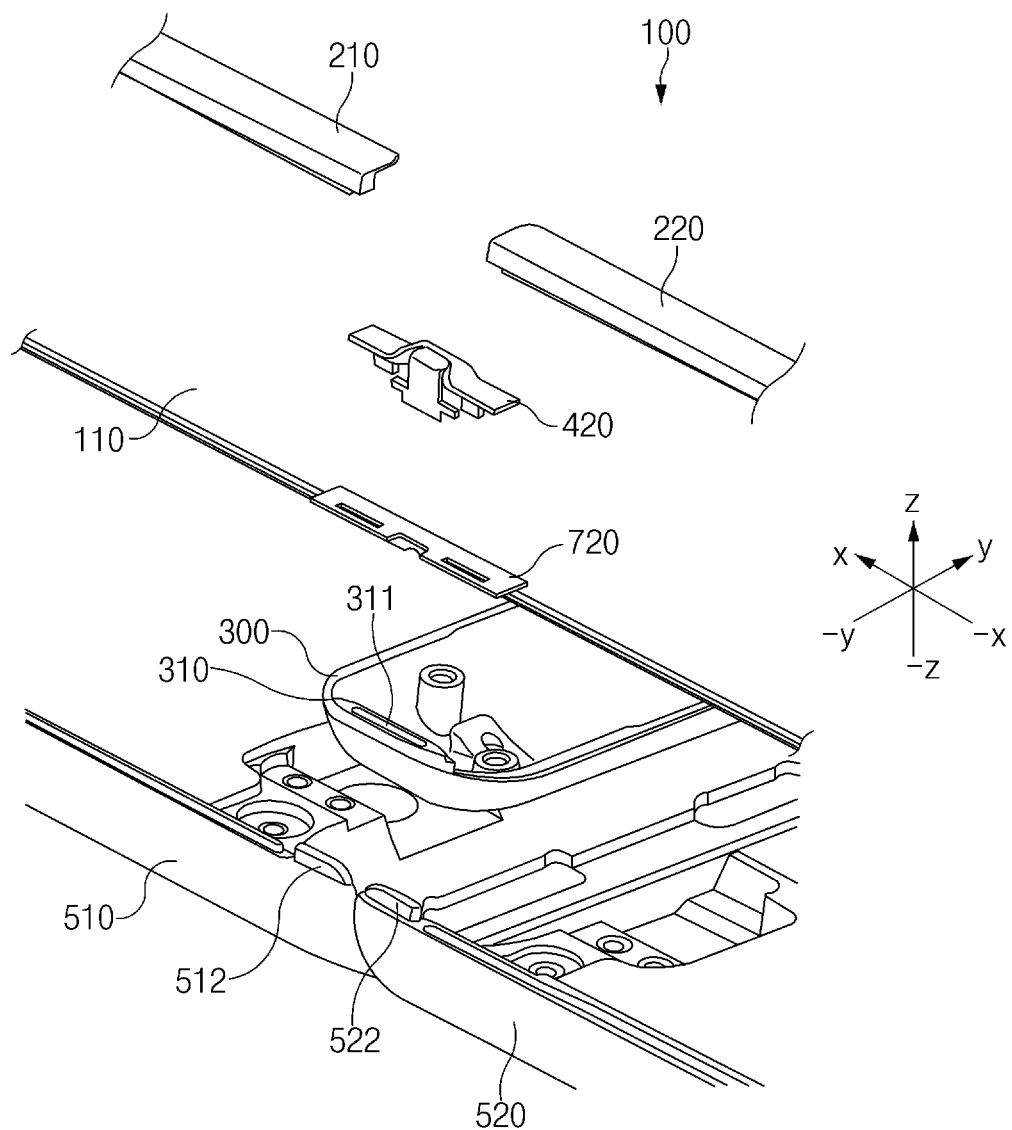
FIG. 10 is a perspective view illustrating one example of a different form of the electronic device according to an embodiment.
Figure 11:
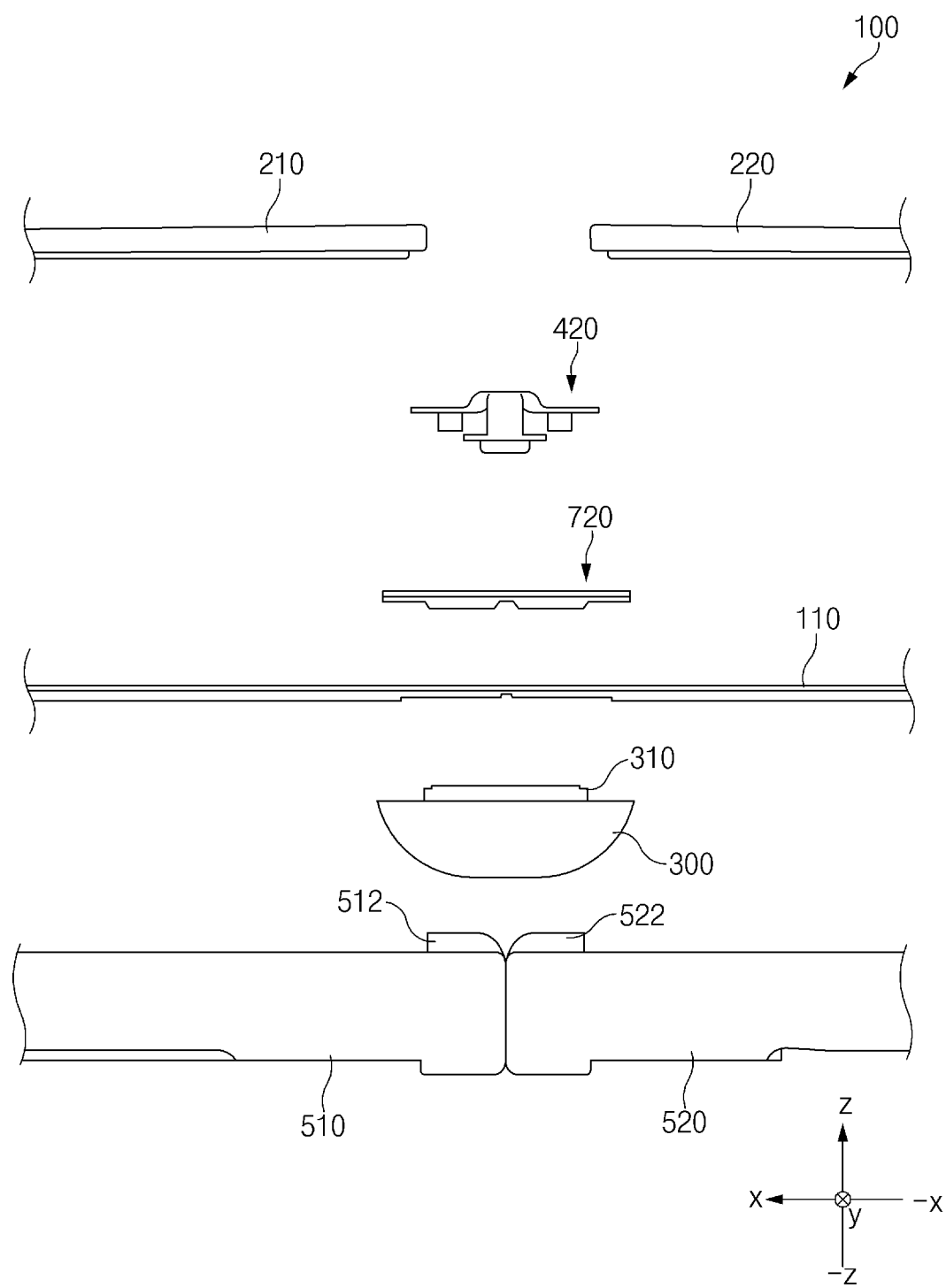
FIG. 11 is a front view illustrating one example of a different form of a partial configuration of the electronic device according to an embodiment.

FIG. 10 is a perspective view illustrating one example of a different form of the electronic device according to an embodiment, and FIG. 11 is a front view illustrating one example of a different form of a partial configuration of the electronic device according to an embodiment. For example, FIGS. 10 and 11 are views illustrating a partial area at the periphery of the electronic device.

Referring to FIGS. 10 and 11, the different form of the electronic device 100 according to an embodiment may include the first housing 510, the second housing 520, the hinge housing 300, the display 110, a second protective member 720, a second supplementary structure 420, the first supplementary member 210, and the second supplementary member 220.

As described above with reference to FIGS. 1A and 1B, the first housing 510 may include a bottom part including a first surface facing in the z-axis direction, a second surface facing in the −z-axis direction, and sidewalls disposed on at least one edge among edges between the first surface and the second surface. An edge facing the second housing 520 among edges of the first housing 510 may have a shape corresponding to the shape of part of a rear surface of the hinge housing 300, such that when the electronic device 100 is in a flat state, part of the hinge housing 300 is disposed on the edge of the first housing 510 faces the second housing 520. The first housing 510 may include the first screen wall 512 disposed on the edges of the first housing 510 that face in the −x-axis direction and the −y-axis direction and that are adjacent to the second housing 520. The first screen wall 512 may serve to hide the inside of the first housing 510 such that the inside of the first housing 510 is not visible from the outside environment. In addition, the first screen wall 512 may serve to block access of an object and foreign matter to a folding area from the outside environment.

As described above with reference to FIGS. 1A and 1B, the second housing 520 may have a structure similar to the structure of the first housing 510. For example, the second housing 520 may include a bottom part including a first surface facing in the z-axis direction and a second surface facing in the −z-axis direction and sidewalls disposed on at least one edge among edges between the first surface and the second surface. An edge facing the first housing 510 among edges of the second housing 520 may have a shape similar to the shape of part of the rear surface of the hinge housing 300 such that when the electronic device 100 is in the flat state, part of the hinge housing 300 is disposed on the edge of the second housing 520 that faces the first housing 510. The second screen wall 522 may be disposed on a portion of the second housing 520 that is adjacent to the first housing 510. Similarly to the first screen wall 512, the second screen wall 522 may hide the inside of the second housing 520, such that the inside of the second housing 520 is not visible from the outside environment. In addition, the second screen wall 522 may serve to block access of an object and foreign matter to a folding area from the outside environment.

In the flat state of the electronic device 100, at least part of the hinge housing 300 may be disposed on bending portions formed on the edge of the first housing 510 that faces in the −x-axis direction and the edge of the second housing 520 that faces in the x-axis direction. The hinge housing 300 may be formed of a material that is the same as, or similar to, that of the first housing 510 and the second housing 520. For example, at least part of the hinge housing 300 may be made of a metallic material. At least part of the inside of the hinge housing 300 may be empty, and at least part of the hinge structure may be disposed in the hinge housing 300. The protrusion 310 further extending in the z-axis direction beyond the peripheral portion may be disposed on an edge (e.g., an edge facing in the −y-axis direction) of the hinge housing 300. At least part of the second supplementary structure 420 may be coupled to the protrusion 310. In this regard, the coupling recess 311 may be formed on the upper surface of the protrusion 310.

The display 110 may be disposed over the hinge housing 300. According to certain embodiments, at least one support plate may be disposed between the display 110 and the hinge housing 300. A central portion of the support plate may have a cutaway state. Alternatively, the central portion of the support plate may be formed in a lattice structure.

The second protective member 720 may be disposed on an edge (e.g., an edge facing in the −y-axis direction or an edge facing in the y-axis direction) where the display 110 and the hinge housing 300 meet. A partial section of the second protective member 720 may have the shape corresponding to a "T". At least part of the second protective member 720 may be formed of an elastic material.

The second supplementary structure 420 may be disposed on an upper portion of the second protective member 720 that faces in the z-axis direction. One side of a lower portion of the second supplementary structure 420 may be coupled with the protrusion 310 formed on the hinge housing 300, and one side of an upper portion of the second supplementary structure 420 may be fastened with the first supplementary member 210 and the second supplementary member 220. The second supplementary structure 420 may be disposed on the edge of the hinge housing 300 that faces in the −y-axis direction (or, an edge of the hinge housing 300 that faces in the y-axis direction) and may block access of an object to the folding area of the electronic device 100 from the outside environment.

The first supplementary member 210 may be disposed to cover at least part of an upper surface (i.e., a surface facing in the z-axis direction) of a rim of the first housing 510. According to an embodiment, an end portion of the first supplementary member 210 that faces in the −x-axis direction may include an empty space inside, such that one side of the first supplementary member 210 is not obstructed by the second supplementary structure 420 while the electronic device 100 performs a hinge operation. Similarly to the first supplementary member 210, the second supplementary member 220 may be disposed to cover at least part of an upper surface (i.e., a surface facing in the z-axis direction) of a rim of the second housing 520. Similarly to the first supplementary member 210, the second supplementary member 220 may include, in an end portion thereof that faces in the x-axis direction, an empty space such that one side of the second supplementary member 220 is not obstructed by the second supplementary structure 420 while the electronic device 100 performs a hinge operation.

Figure 12:
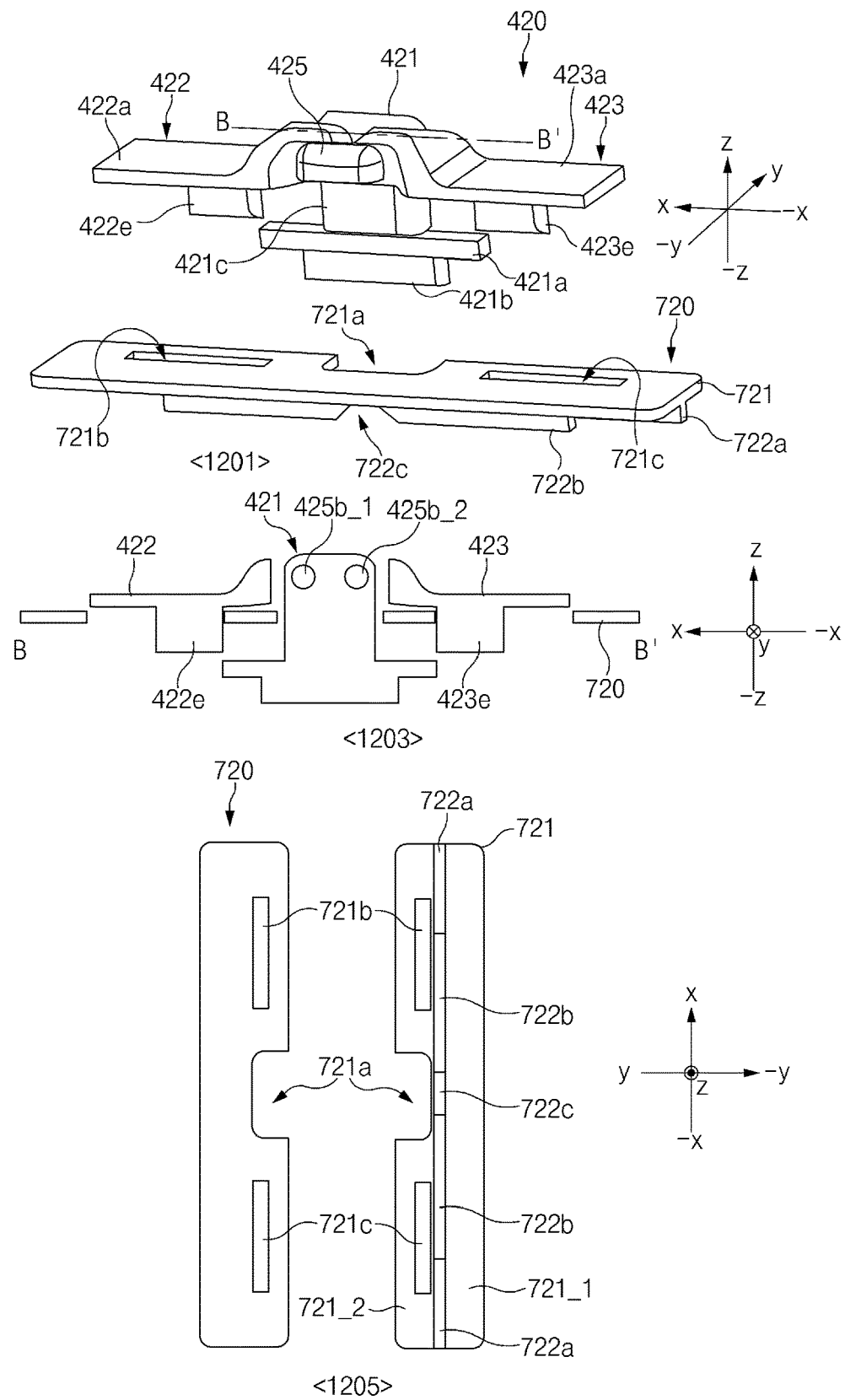
FIG. 12 is a view illustrating a second supplementary structure and a second protective member according to an embodiment.

FIG. 12 is a view illustrating the second supplementary structure and the second protective member according to an embodiment.

Referring to FIG. 12, as illustrated in state 1201, the second supplementary structure 420 according to an embodiment may include a fixing bracket 421, a coupling part 425, a first wing part 422, and a second wing part 423.

The fixing bracket 421 may include a bracket central-portion 421a, a bracket extension 421b, and a bracket hole body 421c that are similar to the components described above with reference to FIG. 4. The bracket extension 421b may extend from the bracket central-portion 421a in the −z-axis direction, and the bracket hole body 421c may be disposed on the bracket central-portion 421a in the z-axis direction. The bracket extension 421b may be fixedly inserted into a coupling recess (e.g., the coupling recess 311 of FIG. 10) that is formed on the hinge housing 300. The bracket hole body 421c may include a plurality of bracket holes formed through front and rear surfaces thereof (e.g., the y-axis to the −y-axis). A wing hole of the first wing part 422 and a wing hole of the second wing part 423 may be aligned with the bracket holes, and coupling pins 425b_1 and 425b_2 of the coupling part 425 may be inserted into the aligned holes. One side of the bracket hole body 421c may be seated in a cover hole 721a formed in the second protective member 720. In this regard, the width and shape of the cover hole 721a of the second protective member 720 may be formed to correspond to at least part of the bracket hole body 421c.

The coupling pins 425b_1 and 425b_2 may extend from one side of the coupling part 425 in the y-axis direction. The fixing bracket 421, the coupling part 425, the first wing part 422, and the second wing part 423 may all be formed of the same material. Alternatively, at least some of the fixing bracket 421, the coupling part 425, the first wing part 422, and the second wing part 423 may be formed of a metallic material.

The first wing part 422 may include a first rotary portion 422a and a first coupling protrusion 422e extending from the first rotary portion 422a in the −z-axis direction. Additionally, as described above with reference to FIG. 4, the first wing part 422 may further include a first extension, the wing hole, and a first support. The width (the thickness in the y-axis direction) of the first rotary portion 422a may be formed to be similar to, or smaller than, the size of the sliding room formed in the first supplementary member 210. The first coupling protrusion 422e may extend in the −z-axis direction from a surface of the first rotary portion 422a oriented in the −z-axis direction, and may have a predetermined width and thickness. Alternatively, the first coupling protrusion 422e may have a shape in which the width of the cross-section gradually decreases along the −z-axis direction. According to certain embodiments, at least part of the first coupling protrusion 422e may have a hook shape. As illustrated in state 1203, the at least part of the first coupling protrusion 422e may be inserted into a first sliding hole 721b formed in the second protective member 720.

The second wing part 423 may have a structure that is the same as, or similar to, the structure of the first wing part 422. The second wing part 423 may be disposed to be symmetrical to the first wing part 422, with respect to the y-axis at the center of the coupling part 425. For example, the second wing part 423 may include a second rotary portion 423a and a second coupling protrusion 423e, and may further include a second extension, the wing hole, and a second support, so as to be fastened with the fixing bracket 421. At least part of the second coupling protrusion 423e may have the same shape and structure as the first coupling protrusion 422e. As illustrated in state 1203, the at least part of the second coupling protrusion 423e may be inserted into a second sliding hole 721c formed in the second protective member 720.

The second protective member 720 may include a cover body 721 disposed to cover at least part of an edge on one side of the hinge housing 300, and an edge on one side of the display 110, the first sliding hole 721b and the second sliding hole 721c formed through front and rear surfaces (e.g., surfaces facing in the z-axis direction and −z-axis direction) of the cover body 721, the cover hole 721a (or, the cover recess) formed on one side of the cover body 721, barriers 722a and 722b extending from the cover body 721 in the −z-axis direction, and a slit 722c. The second protective member 720 may include an area extending from the barriers 722a and 722b in the −y-axis direction and covering at least part of an edge of the display 110 and an area extending from the barriers 722a and 722b in the y-axis direction and covering at least part of an upper opening area of the hinge housing 300.

The cover body 721 may be formed to be longer in the x-axis direction and wider in the y-axis direction than the second supplementary structure 420. At least part of the cover body 721 may be formed of an elastic material (e.g., at least one of a rubber material, a silicone material, a polymer material, or a flexible plastic material). As described above, at an edge on one side of the hinge housing 300, the cover body 721 may be disposed to cover at least part of an edge of the folding area of the display 110 while covering at least part of the protrusion 310 of the hinge housing 300. The cover body 721 may include an area 721_1 covering at least part of an edge of the display 110 and an area 721_2 covering at least part of the upper opening area of the hinge housing 300.

At least part of the cover hole 721a may be open in the y-axis direction in a central area of the cover body 721. At least part of the bracket hole body 421c of the second supplementary structure 420 may be seated in the cover hole 721a. The cover hole 721a may be disposed such that at least part of the coupling recess 311 formed on the protrusion 310 of the hinge housing 300 is exposed to the outside environment. According to an embodiment, the cover hole 721a may have a smaller size than the coupling recess 311.

The first sliding hole 721b may be formed through upper and lower surfaces (e.g., surfaces facing in the z-axis direction and the −z-axis direction) of the cover body 721 and may be biased in the x-axis direction relative to the cover hole 721a. The width of the first sliding hole 721b may be the same as, or similar to, the width of the first coupling protrusion 422e of the second supplementary structure 420. The first sliding hole 721b may be formed to be longer in the x-axis direction than in the y-axis direction. The first coupling protrusion 422e may be inserted into the first sliding hole 721b, and during a hinge operation of the electronic device 100, the first coupling protrusion 422e may slide in the first sliding hole 721b.

The second sliding hole 721c may be formed through the upper and lower surfaces (e.g., the surfaces facing in the z-axis direction and the −z-axis direction) of the cover body 721 and may be biased in the −x-axis direction relative to the cover hole 721a. The second sliding hole 721c may be disposed to be symmetrical to the first sliding hole 721b in the x-axis direction with respect to the cover hole 721a. The width of the second sliding hole 721c may be the same as, or similar to, the width of the second coupling protrusion 423e of the second supplementary structure 420. In a case where the first coupling protrusion 422e and the second coupling protrusion 423e have the same width and size, the second sliding hole 721c may have the same size as the first sliding hole 721b. The second coupling protrusion 423e may be inserted into the second sliding hole 721c, and during a hinge operation of the electronic device 100, the second coupling protrusion 423e may slide in the second sliding hole 721c.

As in state 1205, the first barrier 722a may be disposed on the lower surface of the cover body 721. The first barrier 722a may extend from the cover body 721 in the −z-axis direction and may have a predetermined length along the x-axis. The first barrier 722a may be formed in the same manner in the −x-axis direction with respect to the cover hole 721a. The second protective member 720 may further include the second barrier 722b extending from one side of the first barrier 722a in the −z-axis direction by a predetermined length. The second barrier 722b may have the same thickness as the first barrier 722a and may be shorter than the first barrier 722a (e.g., in the x-axis direction or the −x-axis direction). The second barrier 722b may be formed in the same manner in the x-axis direction with respect to the cover hole 721a.

The slit 722c may be disposed between the second barriers 722b. The slit 722c may have a recess shape that is open in the −z-axis direction. The size of an opening area of the slit 722c may be increased or decreased by a hinge operation of the electronic device 100. The slit 722c may reduce pressure applied to the second protective member 720 during the hinge operation of the electronic device 100, and reduce tension applied to the center of a lower portion of the cover body 721.

Figure 13:
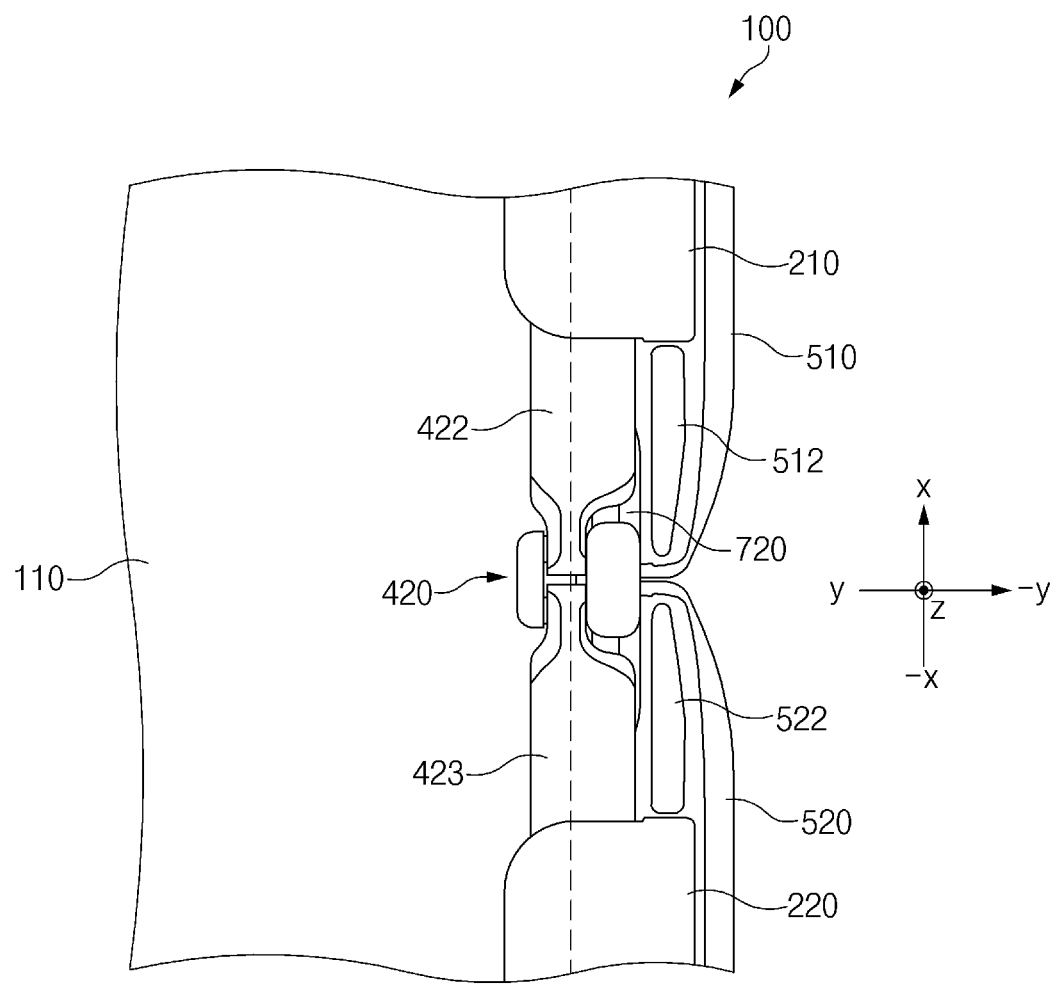
FIG. 13 is a view illustrating a portion of the electronic device having the second supplementary structure applied thereto according to an embodiment.

FIG. 13 is a view illustrating a portion of the electronic device having the second supplementary structure applied thereto according to an embodiment.

Referring to FIG. 13, at least part of the electronic device 100 according to an embodiment may include the first housing 510, the second housing 520, the display 110, the first supplementary member 210, the second supplementary member 220, the second supplementary structure 420, and the second protective member 720. Additionally or alternatively, the hinge housing 300 and at least one hinge structure may be disposed under the second supplementary structure 420 or the second protective member 720 (e.g., in the −z-axis direction). The first screen wall 512 may be disposed on one side of the first housing 510. The first screen wall 512 may extend from an edge on one side of the first housing 510 (e.g., an edge of the first housing 510 that faces the second housing 520 when the electronic device 100 is in a flat state) in the z-axis direction by a predetermined height. The edge of the first screen wall 512 facing the x-axis direction may be disposed to face one side of the first supplementary member 210. The first screen wall 512 may block access of an object to the second supplementary structure 420 from the outside environment while hiding at least part of the second supplementary structure 420. Similarly, the second screen wall 522 may be disposed on one side of the second housing 520. The second screen wall 522 may extend from an edge on one side of the second housing 520 (e.g., an edge of the second housing 520 that faces the first housing 510 when the electronic device 100 is in the flat state) in the z-axis direction by a predetermined height. The edge of the second screen wall 522 facing the x-axis direction may be disposed to face one side of the second supplementary member 220. The edge of the second screen wall 522 that faces in the −x-axis direction may be disposed to face the edge of the first screen wall 512 that faces in the −x-axis direction. The second screen wall 522 may block access of an object to the second supplementary structure 420 from the outside environment while hiding at least part of the second supplementary structure 420.

The second protective member 720 may be disposed under the second supplementary structure 420. In the flat state of the electronic device 100, an edge (e.g., an edge facing in the x-axis direction) on one side of the first wing part 422 of the second supplementary structure 420 may be disposed inside the first supplementary member 210. Similarly, in the flat state of the electronic device 100, an edge (e.g., an edge facing in the −x-axis direction) on one side of the second wing part 423 of the second supplementary structure 420 may be disposed inside the second supplementary member 220. Part of the second supplementary structure 420 may be disposed on the display 110 as to prevent damage to the display 110.

Figure 14:
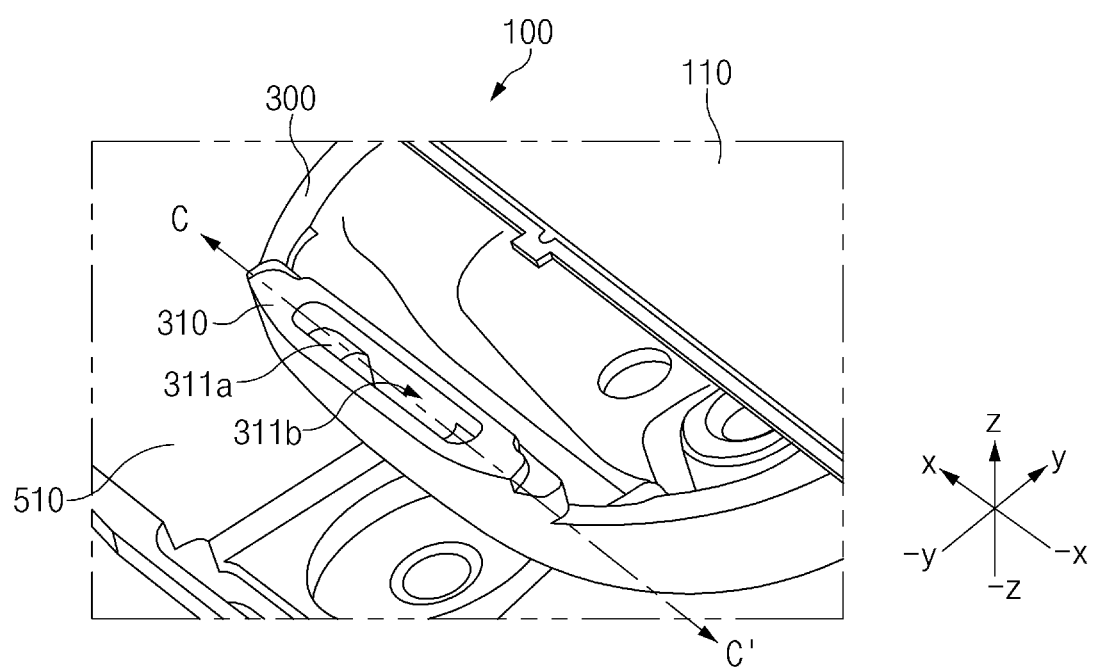
FIG. 14 is a view illustrating one example of a different form of a hinge housing of the electronic device according to an embodiment.
Figure 15:
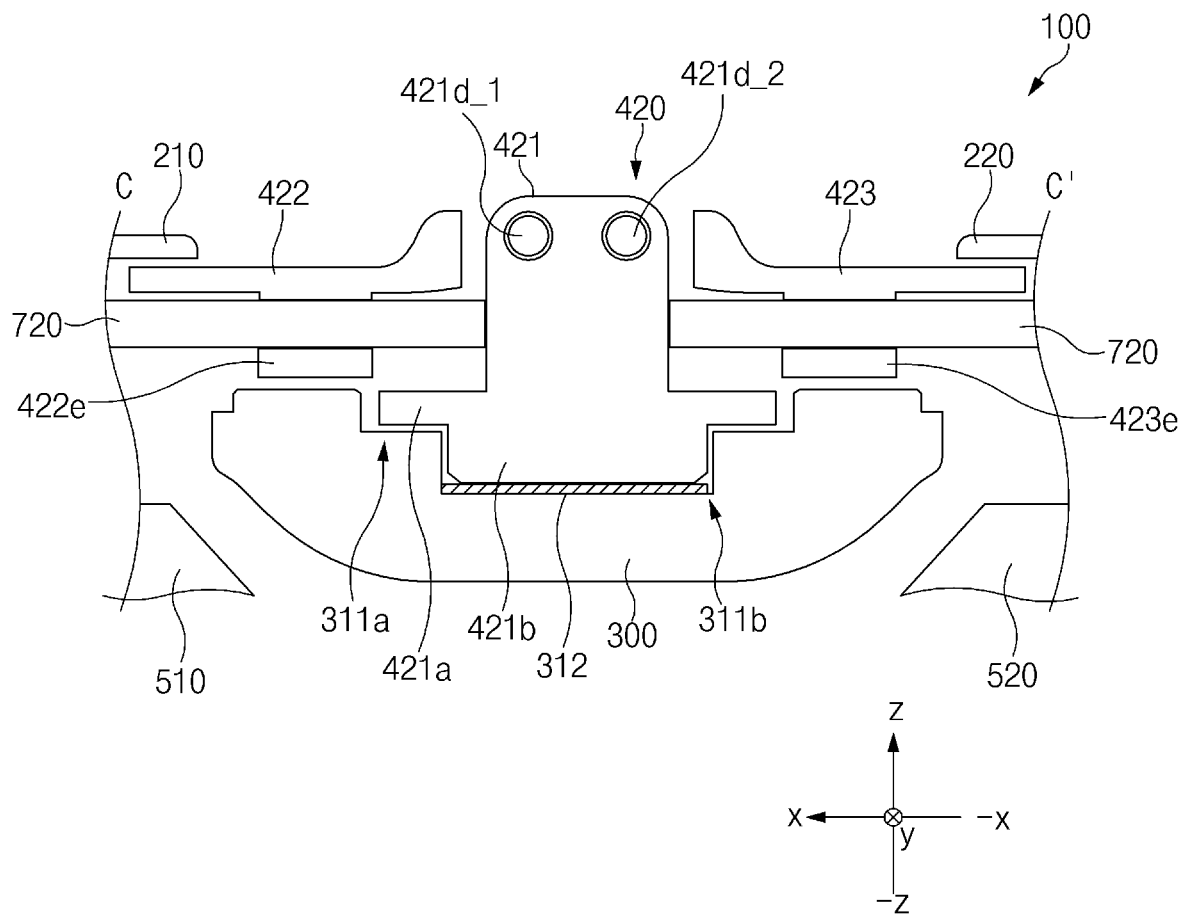
FIG. 15 is a view illustrating one example of a section taken along line C-C' of FIG. 14 when the second supplementary structure is coupled.

FIG. 14 is a view illustrating one example of a different form of the hinge housing of the electronic device according to an embodiment, and FIG. 15 is a view illustrating one example of a section taken along line C-C' of FIG. 14 when the second supplementary structure is coupled.

Referring to FIGS. 14 and 15, a partial configuration of the electronic device 100 according to an embodiment may include the first housing 510, the second housing 520, the hinge housing 300, the second supplementary structure 420, and the display 110. The second supplementary structure 420 may have a structure similar to that of the second supplementary structure 420 mentioned above with reference to FIG. 12, except for a partial structure of the fixing bracket 421. The first supplementary member 210 may be disposed on the first housing 510, and the second supplementary member 220 may be disposed on the second housing 520.

According to certain embodiments, the protrusion 310 protruding in the z-axis direction may be disposed on the hinge housing 300. The coupling recess 311 to which the second supplementary structure 420 is coupled may be formed in the center of the protrusion 310. The coupling recess 311 may include steps formed in the protrusion 310. For example, the coupling recess 311 may include a first step 311a and a second step 311b. The second supplementary structure 420 may be coupled to the coupling recess 311 formed by the first step 311a and the second step 311b. At least part of the second supplementary structure 420 may include, for example, the fixing bracket 421, the first wing part 422, and the second wing part 423, and the first wing part 422 and the second wing part 423 may be fastened to the fixing bracket 421 through coupling pins 421d_1 and 421d_2. The bracket central-portion 421a and the bracket extension 421b of the fixing bracket 421 may be seated in the coupling recess 311. At this time, the periphery of the bracket central-portion 421a may be seated on the first step 311a, and a lower portion of the bracket extension 421b may be seated on the second step 311b. As seen in FIG. 15, an adhesive member 312 may be disposed between a lower surface (a surface facing in the −z-axis direction) of the bracket extension 421b and a bottom surface of the coupling recess 311. According to certain embodiments, an adhesive member may be disposed on at least one of the first step 311a or the second step 311b and may attach the second supplementary structure 420 to the coupling recess 311. For example, the adhesive member 312 may include at least one of a first adhesive member disposed between outer part of the bracket central-portion 421a and the bottom surface (e.g., the first step 311a) of the coupling recess 311 and a second adhesive member disposed between the bracket extension 421b and the bottom surface (e.g., the second step 311b) of the coupling recess 311.

As illustrated in FIGS. 2 and 4, an electronic device according to an embodiment may include a first housing 510, a second housing 520, a hinge structure 600 that connects at least part of the first housing with at least part of the second housing and supports a folding or unfolding operation, a display 110 disposed across the first housing, the second housing, and the hinge structure, a hinge housing 300 in which at least part of the hinge structure is seated, a first member 210 disposed on at least part of a periphery of the first housing adjacent to at least part of the second housing, when the first housing and the second are in a flat state, a second member 220 disposed on at least part of a periphery of the second housing which at least part of the first housing faces when the first housing and the second housing are in the flat state, and a supplementary structure 410 at least partially fastened to an edge portion of the hinge housing to hide at least part of a periphery of the display. The supplementary structure 410 includes a fixing bracket 411 fastened to the hinge housing, a first part 412 having one side coupled to the fixing bracket, at least part of the first part being disposed between the first member and the first housing, a second part 413 having one side coupled to the fixing bracket, at least part of the second part being disposed between the second member and the second housing, and a coupling part 415 that couples the first part and the second part to the fixing bracket.

According to certain embodiments, as illustrated in FIG. 2, the electronic device may further include a protrusion 310 extending from an edge of the hinge housing by a predetermined height in an upper direction in which the display is disposed, the protrusion 310 having a recess 311 formed in the center thereof.

According to certain embodiments, as illustrated in FIG. 4, the fixing bracket may include a bracket extension 411b at least partially inserted into the recess formed in the center of the protrusion, a bracket central-portion 411a formed on the bracket extension, a bracket hole body 411c formed on the bracket central-portion, and a first bracket hole 411d_1 and a second bracket hole 411d_2 that are formed in the bracket hole body and into which the coupling part is inserted while passing through one side of the first part and one side of the second part.

According to certain embodiments, as illustrated in FIG. 15, the electronic device may further include an adhesive member 312 disposed between the bracket extension and a bottom surface of the recess.

According to certain embodiments, a bottom surface of the recess may be formed to have a step 311a or 311b.

According to certain embodiments, the bracket extension and the bracket central-portion may be seated in the recess.

According to certain embodiments, the electronic device may further include an adhesive member 312 disposed at least one of between the bracket extension and the bottom surface of the recess or between part of the bracket central-portion and the bottom surface of the recess.

According to certain embodiments, the electronic device may further include a protective member 710 disposed between the supplementary structure and the hinge housing.

According to certain embodiments, the protective member may be formed of at least one of a rubber material, a flexible plastic material, or a polymer material.

According to certain embodiments, as illustrated in FIG. 2, the protective member may include a cover body 711 that closes a gap formed between the hinge housing and the display and a barrier 712 that extends while forming a predetermined angle with the cover body and that faces one side of the first housing and one side of the second housing.

According to certain embodiments, the protective member may further include a cover hole 711a formed on one side of the cover body, and at least part of a protrusion formed on the hinge housing may be mounted in the cover hole.

According to certain embodiments, as illustrated in FIG. 6, the protective member may further include at least one slit 713a, 713b, or 713c formed in the barrier.

According to certain embodiments, as illustrated in FIG. 12, the cover body 721 may include an area 721_1 that covers at least part of the periphery of the display and an area 721_2 that covers at least part of an upper opening area of the hinge housing.

According to certain embodiments, as illustrated in FIG. 12, the fixing bracket 411 may include a first protrusion 422e protruding from one surface of the first part and a second protrusion 423e protruding from one surface of the second part.

According to certain embodiments, as illustrated in FIG. 12, the protective member may further include a first sliding hole 721b coupled with the first protrusion and a second sliding hole 722b coupled with the second protrusion.

According to certain embodiments, as illustrated in FIG. 7, the first member may include a first sliding recess 211 in which part of the first part is mounted, and the second member may include a second sliding recess 221 in which part of the second part is mounted.

According to certain embodiments, the electronic device may further include an adhesive member 312 disposed in the recess formed on the protrusion.

As illustrated in FIG. 6, an electronic device according to an embodiment may include a first housing 510, a second housing 520, a hinge structure 600 that connects the first housing and the second housing and supports a folding or unfolding operation of the first housing and the second housing, a hinge housing 300 disposed under the first housing and the second housing when the electronic device is in a flat state, at least part of the hinge structure being seated in the hinge housing, a display 110 continuously disposed on the first housing, the second housing, and the hinge structure, and a supplementary structure 410 fastened to an edge portion of the hinge housing. At least part of the supplementary structure is disposed between an edge of the first housing and an edge of the second housing and the display when the electronic device is in the flat state, and at least part of the supplementary structure further protrudes beyond an upper surface of the display. According to another embodiment, wherein at least part of the supplementary structure is disposed between an edge of the first housing, and an edge of the second housing when the electronic device is set in a folded state, and wherein a part of the supplementary structure extends beyond an upper surface of the display when the electronic device is set in the unfolded state.

According to certain embodiments, the electronic device may further include a protective member 710 disposed between the hinge housing and the supplementary structure.

As illustrated in FIGS. 8 and 9, an electronic device according to an embodiment of the disclosure may include a first housing 510, a second housing 520, a hinge structure 600 that connects at least part of the first housing and at least part of the second housing and supports a folding or unfolding operation, a display 110 continuously disposed on the first housing, the second housing, and the hinge structure, a hinge housing 300 in which at least part of the hinge structure is seated, a first member 210 disposed on at least part of a periphery of the first housing that at least part of the second housing faces when the electronic device is in a flat state, a second member 220 disposed on at least part of a periphery of the second housing that at least part of the first housing faces when the electronic device is in the flat state, and a supplementary structure 410 at least partially fastened to an edge portion of the hinge housing to hide at least part of a periphery of the display. At least part of the supplementary structure slides on rear surfaces of the first member and the second member while the electronic device operates from a folded state to the flat state or from the flat state to the folded state.

According to the certain embodiments of the disclosure, damage to a display may be prevented by reinforcing the display with the supplementary structure.

In addition, the disclosure may provide various effects that are directly or indirectly recognized.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a first housing;
   a second housing;
   a hinge structure foldably coupling at least part of the first housing with at least part of the second housing, to support folding and unfolding operations;
   a flexible display disposed over the first housing, the second housing, and the hinge structure;
   a hinge housing in which at least part of the hinge structure is seated;
   a first member disposed on at least part of a periphery of the first housing that is adjacent to at least part of the second housing when the first housing and the second are set in a flat unfolded state;
   a second member disposed on at least part of a periphery of the second housing that at least part of the first housing faces when the first housing and the second housing are set in the flat unfolded state; and
   a supplementary structure at least partially fastened to an edge portion of the hinge housing to hide at least part of a peripheral edge of the flexible display,
   wherein the supplementary structure includes:
   a fixing bracket coupled to the hinge housing;
   a first wing part coupled to the fixing bracket, and disposed between the first member and the first housing;
   a second wing part coupled to the fixing bracket, and disposed between the second member and the second housing; and
   a coupling part coupling the first wing part and the second wing part to the fixing bracket.

2. The electronic device of claim 1, further comprising:
   a protrusion extending from an edge of the hinge housing by a predetermined height in an upwards direction corresponding to a direction in which the display is exposed, the protrusion having a recess formed in a center thereof.

3. The electronic device of claim 2, wherein the fixing bracket includes:
   a bracket extension at least partially inserted into the recess formed in the center of the protrusion;
   a bracket central-portion formed on the bracket extension;
   a bracket hole body formed on the bracket central-portion; and
   a first bracket hole and a second bracket hole formed in the bracket hole body, wherein the coupling part is inserted into the first bracket hole and the second bracket hole and passes through the first wing part and the second wing part.

4. The electronic device of claim 3, further comprising:
   an adhesive member disposed between the bracket extension and a bottom surface of the recess.

5. The electronic device of claim 3, wherein a bottom surface of the recess includes a step.

6. The electronic device of claim 5, wherein the bracket extension and the bracket central-portion are seated in the recess.

7. The electronic device of claim 6, further comprising:
   an adhesive member disposed between the bracket extension and the bottom surface of the recess, or disposed between part of the bracket central-portion and the bottom surface of the recess.

8. The electronic device of claim 1, further comprising:
   a protective member disposed between the supplementary structure and the hinge housing.

9. The electronic device of claim 8, wherein the protective member is formed of at least one of a rubber material, a flexible plastic material, and a polymer material.

10. The electronic device of claim 8, wherein the protective member includes:
a cover body that closes a gap formed between the hinge housing and the display; and
a barrier extending as to form a predetermined angle with the cover body, the barrier facing the first housing and the second housing.

11. The electronic device of claim 10, wherein the protective member further includes:
a cover hole formed on one side of the cover body, wherein at least part of a protrusion formed on the hinge housing is mounted in the cover hole.

12. The electronic device of claim 10, wherein the protective member further includes:
at least one slit formed in the barrier.

13. The electronic device of claim 10, wherein the cover body includes:
a first portion configured to cover at least part of the peripheral edge of the display; and
s second portion configured to cover at least part of an upper opening area of the hinge housing.

14. The electronic device of claim 10, wherein the fixing bracket includes:
a first protrusion extending from a surface of the first wing part; and
a second protrusion extending from a surface of the second wing part.

15. The electronic device of claim 14, wherein the protective member further includes:
a first sliding hole coupled with the first protrusion; and
a second sliding hole coupled with the second protrusion.

16. The electronic device of claim 1, wherein the first member includes a first sliding recess in which at least part of the first wing part is mounted, and wherein the second member includes a second sliding recess in which at least part of the second wing part is mounted.

17. The electronic device of claim 2, further comprising:
an adhesive member disposed in the recess formed on the protrusion.

18. An electronic device, comprising:
a first housing;
a second housing;
a hinge structure connecting the first housing with the second housing and supporting folding and unfolding operations of the first housing and the second housing;
a hinge housing disposed under the first housing and the second housing when the electronic device is set in a flat unfolded state, wherein at least part of the hinge structure is seated in the hinge housing;
a flexible display disposed on the first housing, the second housing, and the hinge structure; and
a supplementary structure coupled to an edge portion of the hinge housing,
wherein at least part of the supplementary structure is disposed between an edge of the first housing, and an edge of the second housing when the electronic device is set in a folded state, and
wherein a part of the supplementary structure extends beyond an upper surface of the display when the electronic device is set in the unfolded state.

19. The electronic device of claim 18, further comprising:
a protective member disposed between the hinge housing and the supplementary structure.

20. An electronic device, comprising:
a first housing;
a second housing;
a hinge structure connecting at least part of the first housing with at least part of the second housing and support folding and unfolding operations;
a flexible display disposed over the first housing, the second housing, and the hinge structure;
a hinge housing in which at least part of the hinge structure is seated;
a first member disposed on at least part of a periphery of the first housing, such that at least part of the second housing faces the first member when the electronic device is set in a flat unfolded state;
a second member disposed on at least part of a periphery of the second housing, such that at least part of the first housing faces the second member when the electronic device is set in the flat unfolded state; and
a supplementary structure coupled to at least part of an edge portion of the hinge housing, the supplementary structure hiding at least part of a peripheral edge of the flexible display,
wherein at least part of the supplementary structure is slidable on rear surfaces of the first member and the second member, when the electronic device transitions from a folded state to the flat unfolded state, or from the flat unfolded state to the folded state.

* * * * *